(12) United States Patent
Inoue

(10) Patent No.: US 11,063,968 B2
(45) Date of Patent: Jul. 13, 2021

(54) COMMUNICATION SYSTEM, COMMUNICATION DEVICE, RELAY DEVICE, COMMUNICATION INTEGRATED CIRCUIT (IC), CONTROL IC, AND COMMUNICATION METHOD

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Masayuki Inoue, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 312 days.

(21) Appl. No.: 16/329,042

(22) PCT Filed: Aug. 24, 2017

(86) PCT No.: PCT/JP2017/030226
§ 371 (c)(1),
(2) Date: Feb. 27, 2019

(87) PCT Pub. No.: WO2018/043264
PCT Pub. Date: Mar. 8, 2018

(65) Prior Publication Data
US 2019/0222599 A1    Jul. 18, 2019

(30) Foreign Application Priority Data

Sep. 2, 2016  (JP) .............................. JP2016-172064
Apr. 4, 2017  (JP) .............................. JP2017-074696

(51) Int. Cl.
*H04L 29/06* (2006.01)
*H04L 12/40* (2006.01)

(52) U.S. Cl.
CPC .... *H04L 63/1425* (2013.01); *H04L 12/40032* (2013.01); *H04L 63/1458* (2013.01); *H04L 2012/40215* (2013.01)

(58) Field of Classification Search
CPC ..... H04L 12/40032; H04L 2012/40215; H04L 63/1425; H04L 63/1458
See application file for complete search history.

(56) References Cited

U.S. PATENT DOCUMENTS

2015/0020152 A1*  1/2015  Litichever ........... H04L 63/1425
                                                          726/1
2017/0126703 A1*  5/2017  Ujiie ....................... H04L 63/08
(Continued)

FOREIGN PATENT DOCUMENTS

JP    2012-028865 A    2/2012

OTHER PUBLICATIONS

Suwatthikul, Jittiwut, Ross McMurran, and R. Peter Jones. "In-vehicle network level fault diagnostics using fuzzy inference systems." Applied Soft Computing 11.4 (2011): 3709-3719. (Year: 2011).*

(Continued)

*Primary Examiner* — Joseph P Hirl
*Assistant Examiner* — Ka Shan Choy
(74) *Attorney, Agent, or Firm* — Honigman LLP

(57) ABSTRACT

Provided are a communication system and method that can block transmission of an abnormal message while allowing transmission and reception of an authorized message. The communication device includes a communication processing unit that sequentially outputs a binary transmission message, a first switch connects a first wire of a bus to a first (Continued)

potential and a second wire to a second potential, an abnormality detection unit detects an abnormality in a message transmitted on the bus, a switching control unit switches, if an abnormality has been detected, the first switch so that the first wire is connected to the first potential and the second wire is connected to the second potential, and a second switch connects the first wire and the second wire via a second resistor. The communication device transmits a message if no abnormality has been detected, and transmits a message if an abnormality has been detected.

23 Claims, 9 Drawing Sheets

(56) References Cited

U.S. PATENT DOCUMENTS

| | | | |
|---|---|---|---|
| 2017/0134358 A1* | 5/2017 | Takada | H04W 12/041 |
| 2018/0025156 A1* | 1/2018 | Dagan | H04L 63/1483 |
| | | | 713/161 |
| 2018/0069874 A1* | 3/2018 | Saeki | H04L 63/1416 |

OTHER PUBLICATIONS

International Search Report, Application No. PCT/JP2017/030226, dated Nov. 21, 2017.

* cited by examiner

COMMUNICATION SYSTEM, COMMUNICATION DEVICE, RELAY DEVICE, COMMUNICATION INTEGRATED CIRCUIT (IC), CONTROL IC, AND COMMUNICATION METHOD

CROSS-REFERENCE TO RELATED APPLICATIONS

This application is the U.S. national stage of PCT/JP2017/030226 filed Aug. 24, 2017, which claims priority of Japanese Patent Application No. JP 2016-172064 filed Sep. 2, 2016 and Japanese Patent Application No. JP 2017-074696 filed Apr. 4, 2017.

TECHNICAL FIELD

The present disclosure relates to a communication system, a communication device, a relay device, a communication integrated circuit (IC), a control IC, and a communication method that allow communication via a two-wire bus according to a differential communication scheme.

BACKGROUND

Conventionally, in vehicles, a plurality of communication devices such as electronic control units (ECUs) are installed and are connected to each other via an in-vehicle network such as a controller area network (CAN). The plurality of ECUs transmit and receive messages to and from each other via the in-vehicle network, and thereby operate in a coordinated manner to realize various functions such as controlling driving the vehicle. Such an in-vehicle network has the risk that, if, for example, an unauthorized device is connected thereto, an unauthorized message may be transmitted thereto, for example.

JP 2013-098719A discloses a communication system in which ECUs each count the number of times a message of each CAN-ID is transmitted, an ECU that transmits a message generates, based on the data field, CAN-ID, and count value of the message, a message authentication code (MAC) and transmits the generated MAC as a MAC message, and an ECU that has received the message compares a MAC generated based on the data field, CAN-ID, and count value of the received message with the MAC included in the MAC message, and determines the validity of the message.

JP 2014-187445A discloses a network monitoring device that monitors a communication state of a communication bus, and, if an interval of reception of a monitored message is shorter than a regular reception interval, the network monitoring device determines that the communication state of the monitored message is abnormal, and, if the interval is longer than the regular reception interval, the network monitoring device determines that the communication state of a message other than the monitored message is abnormal.

The disclosures disclosed in Patent Documents 1 and 2 aim to detect that an abnormal message has been transmitted. However, the disclosures disclosed in Patent Documents 1 and 2 have the problem that, even if abnormal message transmission is detected, they cannot stop the abnormal message transmission. For example, the disclosures disclosed in Patent Documents 1 and 2 cannot block an attack by transmitting a huge amount of abnormal messages to disturb normal message transmission, which is known as a Denial of Service (DoS) attack.

The present disclosure was made in view of such circumstances, and it is an object thereof to provide a communication system, a communication device, a relay device, a communication IC, a control IC, and a communication method that can block transmission of an abnormal message to a network while allowing transmission and reception of a normal message without disturbing it.

SUMMARY

The present disclosure relates to a communication system in which a plurality of communication devices are connected to each other via a two-wire bus, the plurality of communication devices being configured to transmit and receive a message using a differential communication scheme by assigning a first state in which a potential difference between a first wire and a second wire of the bus is large and a second state in which the potential difference is small to binary information constituting the message, wherein the first wire and the second wire are connected to a common potential via respective first resistors, each of the communication devices includes: a communication processing unit configured to generate a message to be transmitted, and sequentially output binary information constituting the generated message; and a first switch configured to be switched between closed and open states based on the binary information that is output by the communication processing unit, and bring the bus into the first state by connecting the first wire to a first potential, which is larger than the common potential, and connecting the second wire to a second potential, which is smaller than the common potential, at least one communication device includes an abnormality detection unit configured to detect an abnormality in a message transmitted on the bus, at least two communication devices including the at least one communication device include: a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state by connecting the first wire and the second wire via a second resistor.

Furthermore, in the communication system according to the present disclosure, the first switch connects the first wire to the first potential, which is larger than the common potential, and connects the second wire to the second potential, which is smaller than the common potential, if a value of the binary information that is output by the communication processing unit is a first value, and the first switch disconnects the first wire from the first potential and disconnects the second wire from the second potential, if the value of the binary information that is output by the communication processing unit is a second value, and the second switch disconnects the first wire and the second wire from each other, if the abnormality detection unit has not detected an abnormality, the second switch connects the first wire and the second wire via the second resistor, if the abnormality detection unit has detected an abnormality and the value of a message to be transmitted is the first value, and the second switch disconnects the first wire and the second wire from each other, if the abnormality detection unit has detected an abnormality and the value of the message to be transmitted is the second value.

Furthermore, in the communication system according to the present disclosure, the at least two communication devices include an output destination switching unit configured to switch an output destination of the binary information that is output by the communication processing unit to the first switch if the abnormality detection unit has not detected an abnormality, and to the second switch if the abnormality detection unit has detected an abnormality.

Furthermore, in the communication system according to the present disclosure, each of the communication devices includes a comparator configured to compare the potential of the first wire with the potential of the second wire and output a value that corresponds to the potential difference, the communication device receiving a message by the communication processing unit obtaining the value output from the comparator, and the at least two communication devices include an inverter configured to invert a logic of the value output from the comparator, and receive a message by the communication processing unit obtaining a value output from the inverter, if the abnormality detection unit has detected an abnormality.

Furthermore, in the communication system according to the present disclosure, the at least one communication device that includes the abnormality detection unit includes an abnormality notification unit configured to notify, if the abnormality detection unit has detected an abnormality, another communication device of the abnormality.

Furthermore, in the communication system according to the present disclosure, the at least two communication devices include a communication integrated circuit (IC) that includes the first switch, the second switch, and the switching control unit.

Furthermore, in the communication system according to the present disclosure, the at least two communication devices include a control IC that includes the communication processing unit, the second switch, and the switching control unit.

Furthermore, in the communication system according to the present disclosure, a plurality of buses are connected to the at least one communication device, and the at least one communication device includes a relay device configured to relay a message between the buses.

Furthermore, the present disclosure relates to a communication system in which a plurality of communication devices are connected to each other via a two-wire bus, the plurality of communication devices being configured to transmit and receive a message using a differential communication scheme by assigning a first state in which a potential difference between a first wire and a second wire of the bus is large and a second state in which the potential difference is small to binary information constituting the message, wherein the first wire and the second wire are connected to a common potential via respective first resistors, each of the communication devices includes: a communication processing unit configured to generate a message to be transmitted, and sequentially output binary information constituting the generated message; and a first switch configured to be switched between closed and open states based on the binary information that is output by the communication processing unit, and bring the bus into the first state by connecting the first wire to a first potential, which is larger than the common potential, and connecting the second wire to a second potential, which is smaller than the common potential, at least one communication device includes an abnormality detection unit configured to detect an abnormality in a message transmitted on the bus, at least two communication devices including the at least one communication device include: a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state by connecting the first wire to the second potential and connecting the second wire to the first potential.

Furthermore, in the communication system according to the present disclosure, the at least two communication devices include a first communication IC that includes the first switch, and a second communication IC that includes the second switch.

Furthermore, in the communication system according to the present disclosure, each of the communication devices includes at least one comparator configured to compare the potential of the first wire with the potential of the second wire and output a value that corresponds to the potential difference, the communication device receiving a message by the communication processing unit obtaining the value output from the comparator, and the first communication IC and the second communication IC respectively have the comparators, the at least two communication devices include an inverter configured to invert a logic of the value output from the comparator of the second communication IC, and the at least two communication devices are configured to: receive a message by the communication processing unit obtaining a value output from the comparator of the first communication IC, if the abnormality detection unit has not detected an abnormality, and receive a message by the communication processing unit obtaining a value output from the inverter, if the abnormality detection unit has an abnormality.

Furthermore, the present disclosure relates to a communication system in which a plurality of communication devices are connected to each other via a two-wire bus, the plurality of communication devices being configured to transmit and receive a message using a differential communication scheme by assigning a first state in which a potential difference between a first wire and a second wire of the bus is large and a second state in which the potential difference is small to binary information constituting the message, wherein the first wire and the second wire are connected to a common potential via respective first resistors, each of the communication devices includes: a communication processing unit configured to generate a message to be transmitted, and sequentially output binary information constituting the generated message; and a first switch configured to be switched between closed and open states based on the binary information that is output by the communication processing unit, and bring the bus into the first state by connecting the first wire to a first potential, which is larger than the common potential, and connecting the second wire to a second potential, which is smaller than the common potential, at least one communication device includes an abnormality detection unit configured to detect an abnormality in a message transmitted on the bus, at least two communication devices including the at least one communication device include: a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state.

Furthermore, the present disclosure relates to a communication device to which a two-wire bus is connected, and that is configured to transmit and receive a message using a differential communication scheme by assigning a first state in which a potential difference between a first wire and a second wire of the bus is large, and a second state in which the potential difference is small to binary information constituting the message, wherein the first wire and the second wire are connected to a common potential via respective first resistors, and the communication device includes: a communication processing unit configured to generate a message to be transmitted, and sequentially output binary information constituting the generated message; a first switch configured to be switched between closed and open states based on the binary information that is output by the communication processing unit, and bring the bus into the first state by connecting the first wire to a first potential, which is larger than the common potential, and connecting the second wire to a second potential, which is smaller than the common potential; an abnormality detection unit configured to detect an abnormality in a message transmitted on the bus; a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state by connecting the first wire and the second wire via a second resistor.

Furthermore, the present disclosure relates to a communication device to which a two-wire bus is connected, and that is configured to transmit and receive a message using a differential communication scheme by assigning a first state in which a potential difference between a first wire and a second wire of the bus is large, and a second state in which the potential difference is small to binary information constituting the message, wherein the first wire and the second wire are connected to a common potential via respective first resistors, and the communication device includes: a communication processing unit configured to generate a message to be transmitted, and sequentially output binary information constituting the generated message; a first switch configured to be switched between closed and open states based on the binary information that is output by the communication processing unit, and bring the bus into the first state by connecting the first wire to a first potential, which is larger than the common potential, and connecting the second wire to a second potential, which is smaller than the common potential; an abnormality detection unit configured to detect an abnormality in a message transmitted on the bus; a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state by connecting the first wire to the second potential and connecting the second wire to the first potential.

Furthermore, the present disclosure relates to a communication device to which a two-wire bus is connected, and that is configured to transmit and receive a message using a differential communication scheme by assigning a first state in which a potential difference between a first wire and a second wire of the bus is large, and a second state in which the potential difference is small to binary information constituting the message, wherein the first wire and the second wire are connected to a common potential via respective first resistors, and the communication device includes: a communication processing unit configured to generate a message to be transmitted, and sequentially output binary information constituting the generated message; a first switch configured to be switched between closed and open states based on the binary information that is output by the communication processing unit, and bring the bus into the first state by connecting the first wire to a first potential, which is larger than the common potential, and connecting the second wire to a second potential, which is smaller than the common potential; an abnormality detection unit configured to detect an abnormality in a message transmitted on the bus; a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state.

Furthermore, the present disclosure relates to a relay device to which a plurality of two-wire buses are connected, and that is configured to transmit and receive a message using a differential communication scheme by assigning a first state in which a potential difference between a first wire and a second wire of the bus is large and a second state in which the potential difference is small to binary information constituting the message, and relay the message between the buses, wherein the first wire and the second wire are connected to a common potential via respective first resistors, and the relay device includes: a communication processing unit configured to generate a message to be transmitted, and sequentially output binary information constituting the generated message; a first switch configured to be switched between closed and open states based on the binary information that is output by the communication processing unit, and bring the corresponding bus into the first state by connecting the first wire to a first potential, which is larger than the common potential, and connecting the second wire to a second potential, which is smaller than the common potential; an abnormality detection unit configured to detect an abnormality in a message transmitted on the bus; a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state by connecting the first wire and the second wire via a second resistor.

Furthermore, the present disclosure relates to a relay device to which a plurality of two-wire buses are connected, and that is configured to transmit and receive a message using a differential communication scheme by assigning a first state in which a potential difference between a first wire and a second wire of the bus is large and a second state in which the potential difference is small to binary information constituting the message, and relay the message between the buses, wherein the first wire and the second wire are connected to a common potential via respective first resistors, and the relay device includes: a communication processing unit configured to generate a message to be transmitted, and sequentially output binary information constituting the generated message; a first switch configured to be switched between closed and open states based on the binary information that is output by the communication processing unit, and bring the corresponding bus into the first state by connecting the first wire to a first potential, which is larger than the common potential, and connecting the second wire to a second potential, which is smaller than the common potential; an abnormality detection unit configured to detect an abnormality in a message transmitted on the bus; a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state by connecting the first wire to the second potential and connecting the second wire to the first potential.

Furthermore, the present disclosure relates to a relay device to which a plurality of two-wire buses are connected, and that is configured to transmit and receive a message using a differential communication scheme by assigning a first state in which a potential difference between a first wire and a second wire of the bus is large and a second state in which the potential difference is small to binary information constituting the message, and relay the message between the buses, wherein the first wire and the second wire are connected to a common potential via respective first resistors, and the relay device includes: a communication processing unit configured to generate a message to be transmitted, and sequentially output binary information constituting the generated message; a first switch configured to be switched between closed and open states based on the binary information that is output by the communication processing unit, and bring the corresponding bus into the first state by connecting the first wire to a first potential, which is larger than the common potential, and connecting the second wire to a second potential, which is smaller than the common potential; an abnormality detection unit configured to detect an abnormality in a message transmitted on the bus; a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state.

Furthermore, the present disclosure relates to a communication IC to which a two-wire bus is connected, and that is configured to transmit and receive a message using a differential communication scheme by assigning a first state in which a potential difference between a first wire and a second wire of the bus is large and a second state in which the potential difference is small to binary information constituting the message, wherein the first wire and the second wire are connected to a common potential via respective first resistors, the communication IC includes: a first switch configured to bring the bus into the first state by connecting the first wire to a first potential, which is larger than the common potential, and connecting the second wire to a second potential, which is smaller than the common potential; a second switch configured to bring the bus into the second state by connecting the first wire and the second wire via a second resistor; a switching control unit configured to switch, if an abnormality in a message transmitted on the bus has been detected, the first switch so that the first wire is connected to the first potential and the second wire is connected to the second potential, bringing the bus into the first state; and an output destination switching unit to which binary information constituting a transmission message is sequentially input, and that is configured to switch an output destination of the input binary information to the first switch if no abnormality has been detected, and to the second switch if such an abnormality has been detected.

Furthermore, the present disclosure relates to a control IC that transmits a message to a communication IC that includes a first switch, by outputting a signal for controlling the first switch to be in a closed state or an open state, the first switch being configured to connect a first wire of a two-wire bus to a first potential, which is larger than the common potential, and connect a second wire of the two-wire bus to a second potential, which is smaller than the common potential, the first wire and the second wire of the two-wire bus being connected to a common potential via respective first resistors, the control IC including: a communication processing unit configured to generate a message to be transmitted, and sequentially output binary information constituting the generated message; a second switch configured to connect the first wire and the second wire via a second resistor; a switching control unit configured to switch, if an abnormality in a message transmitted on the bus has been detected, the first switch so that the first wire is connected to the first potential and the second wire is connected to the second potential; and an output destination switching unit configured to switch an output destination of the binary information from the communication processing unit to the first switch if an abnormality has not been detected, and to the second switch if such an abnormality has been detected.

Furthermore, the present disclosure relates to a communication method for a plurality of communication devices transmitting and receiving a message using a differential communication scheme by assigning a first state in which a potential difference between a first wire and a second wire of a bus is large and a second state in which the potential difference is small to binary information constituting the message, wherein the first wire and the second wire are connected to a common potential via respective first resistors, each communication device switches a first switch between closed and open states based on binary information constituting a message to be transmitted, and transmits the message, the first switch being configured to bring the bus into the first state by connecting the first wire to a first potential, which is larger than the common potential, and connecting the second wire to a second potential, which is smaller than the common potential, at least one communication device detects an abnormality in a message transmitted on the bus, and if the abnormality has been detected, at least two communication devices that include the at least one communication device switches the first switch so that the first wire is connected to the first potential and the second wire is connected to the second potential, and switches a second switch between closed and open states based on binary information constituting the message to be transmitted, and transmits the message, the second switch being configured to bring the bus into the second state by connecting the first wire and the second wire via a second resistor.

Furthermore, the present disclosure relates to a communication method for a plurality of communication devices transmitting and receiving a message using a differential communication scheme by assigning a first state in which a potential difference between a first wire and a second wire of a bus is large and a second state in which the potential difference is small to binary information constituting the message, wherein the first wire and the second wire are connected to a common potential via respective first resistors, each communication device switches a first switch between closed and open states based on binary information constituting a message to be transmitted, and transmits the message, the first switch being configured to bring the bus into the first state by connecting the first wire to a first potential, which is larger than the common potential, and connecting the second wire to a second potential, which is smaller than the common potential, at least one communication device detects an abnormality in a message transmitted on the bus, and if the abnormality has been detected, at least two communication devices that include the at least one communication device switches the first switch so that the first wire is connected to the first potential and the second wire is connected to the second potential, and switches a second switch between closed and open states based on binary information constituting the message to be transmitted, and transmits the message, the second switch being configured to bring the bus into the second state by connecting the first wire to the second potential and connecting the second wire to the first potential.

Furthermore, the present disclosure relates to a communication method for a plurality of communication devices transmitting and receiving a message using a differential communication scheme by assigning a first state in which a potential difference between a first wire and a second wire of a bus is large and a second state in which the potential difference is small to binary information constituting the message, wherein the first wire and the second wire are connected to a common potential via respective first resistors, each communication device switches a first switch between closed and open states based on binary information constituting a message to be transmitted, and transmits the message, the first switch being configured to bring the bus into the first state by connecting the first wire to a first potential, which is larger than the common potential, and connecting the second wire to a second potential, which is smaller than the common potential, at least one communication device detects an abnormality in a message transmitted on the bus, and if the abnormality has been detected, at least two communication devices that include the at least one communication device switches the first switch so that the first wire is connected to the first potential and the second wire is connected to the second potential, and switches a second switch between closed and open states based on binary information constituting the message to be transmitted, and transmits the message, the second switch being configured to bring the bus into the second state.

In the communication system according to the present disclosure, a plurality of communication devices are connected to each other via a two-wire bus, and transmit and receive a message using a differential communication scheme by respectively assigning the first state in which the first wire and the second wire of the bus has a large potential difference and the second state in which they have a small potential difference to first and second values of binary information constituting the message. For example, in a CAN communication scheme, a message is transmitted or received by assigning the first state of the bus to "0" of digital information of the message, and assigning the second state of the bus to "1".

The second state in which the potential difference is small is realized, since the first wire and the second wire of the bus are connected to the common potential via the first resistors. This second state corresponds to a "recessive value (recessive)" of the CAN communication scheme, and is assigned to "1" of the message. When transmitting a "0" of the message to the bus, a communication device connected to the bus controls closing/opening of the first switch to connect the first wire of the bus to the first potential (>common potential) and connect the second wire to the second potential (<common potential), thereby bringing the bus into the first state in which the potential difference is large. This first state corresponds to a "dominant value (dominant)" of the CAN communication scheme, and is assigned to "0" of the message.

According to this configuration, if all of the communication devices connected to the bus output "1" of the message, the bus will take on the second state, and if at least one communication device outputs "0" of the message, the bus will take on the first state. This is the reason why "0" of the message and the first state of the bus correspond to "dominant value", and arbitration processing and the like of the CAN communication scheme are executed using the characteristics of "dominant value" and "recessive value".

The communication system according to the present disclosure includes the abnormality detection unit configured to detect an abnormality in a message transmitted on the bus. A configuration is also possible in which, for example, all of the communication devices connected to the bus include the abnormality detection unit. Alternatively, a configuration is also possible in which, for example, at least one of the plurality of communication devices connected to the bus includes the abnormality detection unit, and the communication device that has detected an abnormality notifies another communication device that does not have the abnormality detection function of that fact.

Note that the abnormality detection unit perform any abnormality detecting method. For example, a configuration is also possible in which a message with a MAC is transmitted and received, and the abnormality detection unit determines whether or not the message is abnormal based on determination of whether or not this MAC is correct. Furthermore, a configuration is also possible in which the abnormality detection unit determines whether or not a message is abnormal by determining whether or not a transmission period of the message is a correct period, for example.

If the abnormality detection unit has detected an abnormality in a message, the communication system according to the present disclosure connects the first wire of the bus to the first potential and connects the second wire to the second potential. Accordingly, the bus is fixed to the first state in which the potential difference is large, and thus the communication devices connected to the bus cannot transmit information of the message that corresponds to the second state of the bus, and thus cannot continue transmitting the abnormal message.

Note, however, that there is the risk that, due to the bus being fixed to the first state, authorized message transmission that is executed by an authorized communication device is also blocked. Accordingly, the communication device of the present disclosure has the function of enabling message transmission even if the bus is fixed to the first state as a result of detection of an abnormality. Note that all of the communication devices of the communication system do not need to have this function, and it is sufficient that at least two communication devices that need to perform communication even when an abnormality has occurred have this function.

The communication device according to the present disclosure controls the second switch, which connects and disconnects the first wire and the second wire of the bus via the second resistor, changes the bus fixed to the first state to the second state by closing this second switch so as to bring the bus into the second state in which the potential difference is small, and transmits information of the message that corresponds to the second state. Note, here, that, in contrast to the CAN communication scheme, the first state in which the potential difference of the bus is large corresponds to "recessive", and the second state in which the potential difference is small corresponds to "dominant".

Accordingly, the communication system of the present embodiment can transmit, by controlling the second switch, a message to the bus fixed to the first state even after an abnormality has been detected.

Also, according to the present disclosure, in a state in which no abnormality has been detected, closing/opening of the first switch is controlled so that the bus takes on the first state if the value of a transmission message is a first value (for example, "0"), and the bus takes on the second state if the value is a second value (for example, "1"). The second switch is set in the open state.

In contrast, if an abnormality has been detected, closing/opening of the second switch is controlled so that the bus takes on the second state if the value of the transmission message is a first value (for example, "0"), and the bus takes on the first state if the value is a second value (for example, "1"). The first switch is set in the closed state.

With these measures, the communication device can transmit a message by assigning the first value of the transmission message to the dominant state of the bus and the second value to the recessive state.

Also, according to the present disclosure, the communication processing unit of the communication device performs control such that binary information constituting a transmission message is sequentially output, and the output destination of the binary information is switched between the first switch and the second switch, based on whether or not an abnormality has been detected. Accordingly, it is possible to easily and reliably switch control of the state of the bus based on the binary information constituting the transmission message, depending on whether or not an abnormality has been detected.

Also, according to the present disclosure, depending on whether or not an abnormality has been detected, the relationship between dominant and recessive of the first state and the second state of the bus is inverted, and the correspondence relationship between the first value and the second value of binary information constituting a transmission message, and the first and second states of the bus is also inverted. Accordingly, when the potentials of the bus are compared using the comparator and a message is received, the logic of a value output from the comparator is inverted, using the inverter, depending on whether or not an abnormality has been detected, thus making it possible to perform message reception, regardless of whether or not an abnormality has been detected.

Also, according to the present disclosure, a communication device that includes an abnormality detection unit notifies another communication device that does not include an abnormality detection unit of the fact that an abnormality has been detected. Any notification method may be used, but a configuration is also possible in which, for example, closing/opening of the second switch is controlled and a suitable message is transmitted, or a notification may be made by, for example, setting the first switch in the closed state so that the bus is fixed to the first state. Accordingly, not all of the communication devices included in the communication system need to perform abnormality detection.

Also, according to the present disclosure, a communication IC that includes the above-described first switch, second switch, and switching control unit configured to close the first switch so that the bus is fixed to the first state if an abnormality has been detected is used to configure a communication device. For example, a CAN controller IC, which performs communication according to a CAN communication scheme, includes the first switch, and thus by adding the second switch and the switching control unit to this communication IC, the above-described communication IC can be realized. Accordingly, if, for example, a microcomputer of a communication device has the abnormality detection function, the communication system according to the present disclosure can be easily realized by replacing a communication IC by the above-described one.

Also, according to the present disclosure, a control IC that includes the above-described second switch, switching control unit, and communication processing unit for generating a transmission message is used to configure a communication device. The communication system according to the present disclosure can be easily realized using, for example, a communication device conforming to a CAN communication scheme with a microcomputer or the like that performs communication using a CAN controller replaced by this control IC.

Also, according to the present disclosure, at least two communication devices that have the abnormality detection function and transmit a message using the second switch when an abnormality was detected include a relay device. The relay device is a device to which a plurality of buses are connected, and performs processing for relaying a message between the buses. According to this configuration, the relay device may perform, for each bus, abnormality detection and message transmission using the second switch. In other words, the relay device may detect, for each of the plurality of buses connected thereto, whether or not an abnormality has occurred, and may transmit a message using the second switch only for the bus for which an abnormality has been detected.

Also, the present disclosure uses, in place of the above-described second switch that connects and disconnect the first wire and the second wire of the bus via the second resistor, a second switch configured to connect the first wire of the bus to the second potential and connect the second wire to the first potential. If, in a state in which, due to detection of an abnormality, the first wire of the bus is connected to the first potential and the second wire is connected to the second potential by the first switch, the second switch connects the first wire to the second potential and the second wire to the first potential, the first wire and the second wire of the bus will both have a potential that is substantially intermediate between the first potential and the second potential. In other words, the bus that was fixed to the first state in which the potential difference is large by the first switch can be switched to the second state in which the potential difference is small by the second switch.

Accordingly, the communication system according to the present disclosure can transmit a message to the bus fixed to the first state even after an abnormality has detected, by controlling the second switch.

Also, according to the present disclosure, at least two communication devices that transmit a message using the second switch when an abnormality was detected are provided with the first communication IC that includes the first switch, and the second communication IC that includes the second switch. The first communication IC and the second communication IC have almost the same configuration, and two communication ICs that are substantially the same are installed in the communication device, and one can be set as the first communication IC and the other one can be set as the second communication IC. Existing CAN controller ICs or the like may be used as the two communication ICs, and message transmission using the second switch when an abnormality was detected can be realized by using the exiting communication ICs.

Also, according to the present disclosure, the first communication IC and the second communication IC each have a comparator for receiving a message. If no abnormality has been detected, a message can be received by the comparator of the first communication IC. According to the present disclosure, depending on whether or not an abnormality has been detected, the relationship between dominant and recessive of the first state and the second state of the bus is inverted, and the correspondence relationship between the first value and the second value of binary information constituting a transmission message, and the first and second states of the bus is also inverted. Accordingly, the logic of a value output from the comparator of the second communication IC is inverted using the inverter, and by performing message reception using an output by the inverter if an abnormality has been detected, it is possible to receive a message, regardless of whether or not an abnormality has been detected.

Also, according to the present disclosure, after the bus has been fixed to the first state by the first switch upon detection of an abnormality, message transmission is performed using the second switch that switches the bus between the first state and the second state. As this second switch, a second switch that connects and disconnects the first wire and the second wire of the bus via the second resistor, or a second switch that connects the first wire of the bus to the second potential and the second wire to the first potential is employed, but the second switch is not limited to them. The second switch for transmitting a message after an abnormality has been detected may have any configuration as long as it can switch the bus, when it was fixed to the first state by the first switch, between the second state and the first state by switching conduction and interruption.

Advantageous Effects of Disclosure

The present disclosure has a configuration in which message transmission is performed by closing, if an abnormality in a message transmitted on a bus has been detected, a first switch so that the bus is fixed to a first state in which the potential difference of the bus is large, and controlling closing/opening of a second switch that connects a first wire and a second wire of the bus to each other to change the bus to a second state. Also, the present disclosure has a configuration in which message transmission is performed by bringing, if an abnormality has been detected, the bus into the first state using the first switch, and controlling closing/opening of the second switch that connects the first wire of the bus to the second potential and the second wire to the first potential. With these measures, it is possible to block abnormal message transmission to a bus while allowing transmission and reception of an authorized message without disturbing it.

DETAILED DESCRIPTION OF PREFERRED EMBODIMENTS

Embodiment 1

Figure 1:
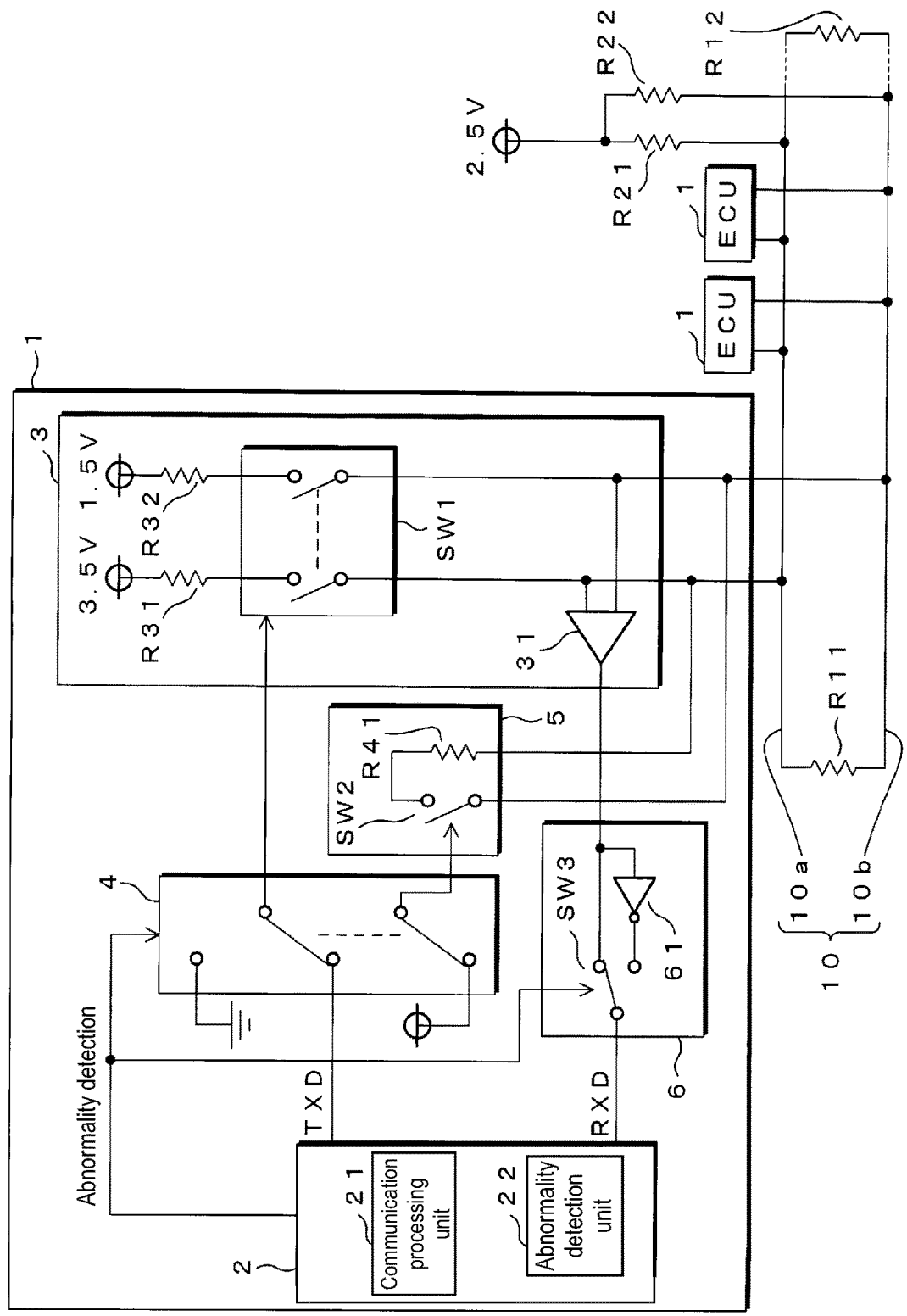
FIG. 1 is a diagram schematically illustrating a configuration of a communication system according to Embodiment 1.

FIG. 1 is a diagram schematically illustrating a configuration of a communication system according to Embodiment 1. The communication system according to Embodiment 1 is a system in which a plurality of ECUs 1 installed in, for example, a not-shown vehicle transmit and receive messages in accordance with a CAN communication scheme, and operate in a coordinated manner to perform driving control of the vehicle, and the like. The plurality of ECUs 1 are connected to a communication cable for performing wired communication in accordance with the CAN communication scheme, the communication cable being referred to as a CAN bus 10. The CAN bus 10 is a two-line bus using a twisted pair cable, and is configured to include a first wire 10a and a second wire 10b.

The first wire 10a and the second wire 10b of the CAN bus 10 are connected to each other at both ends thereof via terminating resistors R11 and R12. The resistance values of the terminating resistors R11 and R12 may be set to 120Ω, for example. Furthermore, the first wire 10a and the second wire 10b of the CAN bus 10 are connected to a common potential (for example, 2.5 V) via resistors R21 and R22, respectively. Accordingly, the electric potentials of the first wire 10a and the second wire 10b are both equal to the common potential in a state in which the ECUs 1 connected thereto do not output a signal to the CAN bus 10.

Each of the ECUs 1 connected to the CAN bus 10 is configured to include a control IC 2, a communication IC 3, a transmission switching circuit 4, a switch circuit 5, a reception switching circuit 6, and the like. Note that, in FIG. 1, only functional blocks for performing communication that are common to the ECUs 1 are shown but functional blocks for performing control processing or the like that are individual for each ECU 1 are not shown. Furthermore, in the present embodiment, since the plurality of ECUs 1 connected to the CAN bus 10 have the same configuration with respect to the communication function, in FIG. 1, the configuration of a single ECU 1 is shown but the configurations of the remaining ECUs 1 are not shown.

The control IC 2 of the ECU 1 is an IC such as a microcomputer or a central processing unit (CPU). By reading a program stored in a not-shown read only memory (ROM) or the like and executing the read program, the control IC 2 performs arithmetic processing for realizing control required for driving the vehicle, for example. Furthermore, the control IC 2 of the ECU 1 according to the present embodiment is provided with, as functional blocks for performing communication-related processing, a communication processing unit 21, an abnormality detection unit 22, and the like. The communication processing unit 21, the abnormality detection unit 22, and the like may be software functional blocks that are realized by the control IC 2 executing a program, or hardware functional blocks that are configured as circuits.

The communication processing unit 21 of the control IC 2 performs processing for generating messages to be transmitted to other ECUs 1, transmitting the generated messages, and obtaining messages received from other ECUs 1. The communication processing unit 21 generates a transmission message that includes information to be transmitted to other ECUs 1, such as a result that was detected by a sensor included in that ECU 1 and is to be transmitted to other ECUs 1, for example. Messages that are transmitted and received by the ECU 1 are constituted by a sequence of multiple bits (binary information), and a bit sequence of the transmission message generated by the communication processing unit 21 is sequentially output, starting with the header, from the output terminal of the control IC 2 as an output signal TXD. Furthermore, a message transmitted from another ECU 1 is received by the communication IC 3, and a bit sequence of the received message is sequentially input to the control IC 2 as an input signal RXD. The communication processing unit 21 of the control IC 2 obtains the received message by repeatedly sampling and acquiring the input signal RXD.

The abnormality detection unit 22 of the control IC 2 determines whether or not a message that was received from another ECU 1 and obtained by the communication processing unit 21 is abnormal. In the present embodiment, the abnormality detection unit 22 of the control IC 2 may perform any abnormality detecting method. If, for example, the communication processing unit 21 is configured to transmit a message with a MAC, the abnormality detection unit 22 may be configured to perform abnormality detection based on whether or not a MAC included in a received message is correct. Furthermore, if, for example, each ECU 1 is configured to periodically perform message transmission, the abnormality detection unit 22 may be configured to store the transmission period for each CAN-ID included in a message, and perform abnormality detection based on whether or not a received message satisfies a condition of this transmission period. The control IC 2 outputs a result of the detection performed by the abnormality detection unit 22 as an abnormality detection signal, and the output abnormality signal is input to the transmission switching circuit 4 and the reception switching circuit 6.

The communication IC 3 is connected to the first wire 10a and the second wire 10b that constitute the CAN bus 10. The communication IC 3 includes a switch SW1 that connects the first wire 10a of the CAN bus 10 to a first potential (for example, 3.5 V), which is higher than a reference potential (2.5 V), via the resistor R31 and connects the second wire 10b to a second potential (for example, 1.5 V), which is lower than the reference potential, via the resistor R32, and switches the switch SW1 between closed and open states based on whether the input data of a transmission message is a "0" or a "1", thereby transmitting the message. The communication IC 3 further includes a comparator 31 that compares the potential of the first wire 10a with the potential of the second wire 10b, determines whether or not the potential difference exceeds a threshold, and outputs a determination result.

When the input data is "0", the communication IC 3 brings the switch SW1 into the closed state so that the first wire 10a of the CAN bus 10 is at 3.5 V for example and the second wire 10b is at 1.5 V for example, and thus the potential difference between the first wire 10a and the second wire 10b is 2.0 V. If, for example, the threshold for determination that is performed by the comparator 31 of each ECU 1 is set to 1.0 V for example, the comparator 31 determines that the potential difference of 2.0 V is larger than the threshold 1.0 V, and outputs an output signal indicating that the potential difference exceeds the threshold, that is, a signal of the potential that corresponds to a "0". In contrast, when the input data is "1", the communication IC 3 brings the switch SW1 into the open state so that the first wire 10a and the second wire 10b of the CAN bus 10 are respectively disconnected from the potentials 3.5 V and 1.5 V. Accordingly, the first wire 10a and the second wire 10b, which are connected via the respective resistors R21 and R22 to the common potential (2.5 V), have both the potential 2.5 V unless any other ECU 1 transmits a message of a "0", and thus the potential difference is 0 V. The comparator 31 of the ECU 1 determines that the potential difference of 0 V is smaller than the threshold 1.0 V, and outputs an output signal indicating that the potential difference does not exceed the threshold, that is, a signal of the potential that corresponds to a "1".

In the case of a conventional ECU, output signals TXD of a control IC 2 are directly input to a communication IC 3 so that closing/opening of a switch SW1 is switched, and output signals of the communication IC 3 are directly input to the control IC 2 as input signals RXD and are obtained as a received message. In contrast, each ECU 1 of the present embodiment includes the transmission switching circuit 4 and the reception switching circuit 6 between the control IC 2 and the communication IC 3. In other words, output signals TXD of the control IC 2 are input to the communication IC 3 via the transmission switching circuit 4, and output signals of the communication IC 3 are input, as input signals RXD, to the control IC 2 via the reception switching circuit 6.

The transmission switching circuit 4 is a circuit for switching a signal to be input to the communication IC 3, based on an abnormality detection signal output from the control IC 2. If no abnormality has been detected, the transmission switching circuit 4 inputs output signals TXD from the control IC 2 to the communication IC 3 to give a transmission message to the communication IC 3, and causes the communication IC 3 to transmit the message to another ECU 1. In contrast, if an abnormality has been detected, the transmission switching circuit 4 inputs a ground potential (that is, the potential that corresponds to a "0" of the transmission message) to the communication IC 3. If the input signal is fixed to the ground potential by the transmission switching circuit 4, the switch SW1 of the communication IC 3 is maintained in the closed state, and the CAN bus 10 is kept in a state in which the potential difference between the first wire 10a and the second wire 10b is equal to 2.0 V.

Also, if the transmission switching circuit 4 fixes the input to the communication IC 3 to the ground potential after an abnormality has been detected, output signals TXD from the control IC 2 are input to the switch circuit 5. The switch circuit 5 is connected in series between the first wire 10a and the second wire 10b of the CAN bus 10, and includes a resistor R41 and a switch SW2. Upon input of a potential that corresponds to a "0" as an input signal from the transmission switching circuit 4, the switch circuit 5 switches the switch SW2 to a closed state and connects the first wire 10a and the second wire 10b of the CAN bus 10 to each other via the resistor R41. Note that it is assumed that the resistance value of the resistor R41 is sufficiently smaller than the resistance values of the resistors R31 and R32. Accordingly, if the switch SW2 is switched to the closed state, the first wire 10a and the second wire 10b will be in a short circuit state, and the potential difference is about 0 V. Also, upon input of a potential that corresponds to a "1" as an input signal from the transmission switching circuit 4, the switch circuit 5 switches the switch SW2 to an open state. Accordingly, the first wire 10a and the second wire 10b are not connected to each other via the resistor R41 but in a disconnected state. Note that, if no abnormality has been detected, the transmission switching circuit 4 inputs, to the switch circuit 5, a power supply potential (that is, the potential that corresponds to a "1" of the transmission message) for example, and thus the switch SW2 of the switch circuit 5 is maintained in the open state.

The reception switching circuit 6 is configured to include an inverter 61 and a switch SW3. A signal output from the comparator 31 of the communication IC 3, that is, a signal that corresponds to a message received by the communication IC 3 is input to the reception switching circuit 6. The inverter 61 of the reception switching circuit 6 is an inverter configured to invert the logic of an input signal and output the logic-inverted signal. The inverter 61 inverts the signal from the communication IC 3 and outputs the inverted signal. The switch SW3 selects, based on an abnormality detection signal output from the control IC 2, an input signal from the communication IC 3 or a signal obtained by the inverter 61 inverting this input signal, and outputs the selected signal. If no abnormality has been detected, the reception switching circuit 6 inputs a signal from the communication IC 3 as an input signal RXD to the control IC 2. If an abnormality has been detected, the reception switching circuit 6 inputs, to the control IC 2, a signal obtained by the inverter 61 inverting the logic of the signal from the communication IC 3, as an input signal RXD.

The ECU 1 of the present embodiment switches, if the abnormality detection unit 22 has not detected an abnormality in a message on the CAN bus 10, the switch of the transmission switching circuit 4, the switch SW2 of the switch circuit 5, and the switch SW3 of the reception switching circuit 6 to the state shown in FIG. 1. In this state, closing/opening of the switch SW1 of the communication IC 3 is controlled based on an output signal TXD from the control IC 2, and a message is transmitted to the CAN bus 10. In other words, the switch SW1 is switched to the closed state based on a "0" of a transmission message and the CAN bus 10 is in a state in which the potential difference is large, and the switch SW1 is switched to the open state based on a "1" of the transmission message and the CAN bus 10 is in a state in which the potential difference is small. Also, in this state, the output of the comparator 31, which compares the potential of the first wire 10a of the CAN bus 10 with the potential of the second wire 10b, is directly input as an input signal RXD to the control IC 2, and a received message is obtained by the control IC 2. The operation of the ECU 1 in this state is the same as the operation of a conventional ECU that performs message transmission and reception in accordance with a CAN communication scheme.

Figure 2:
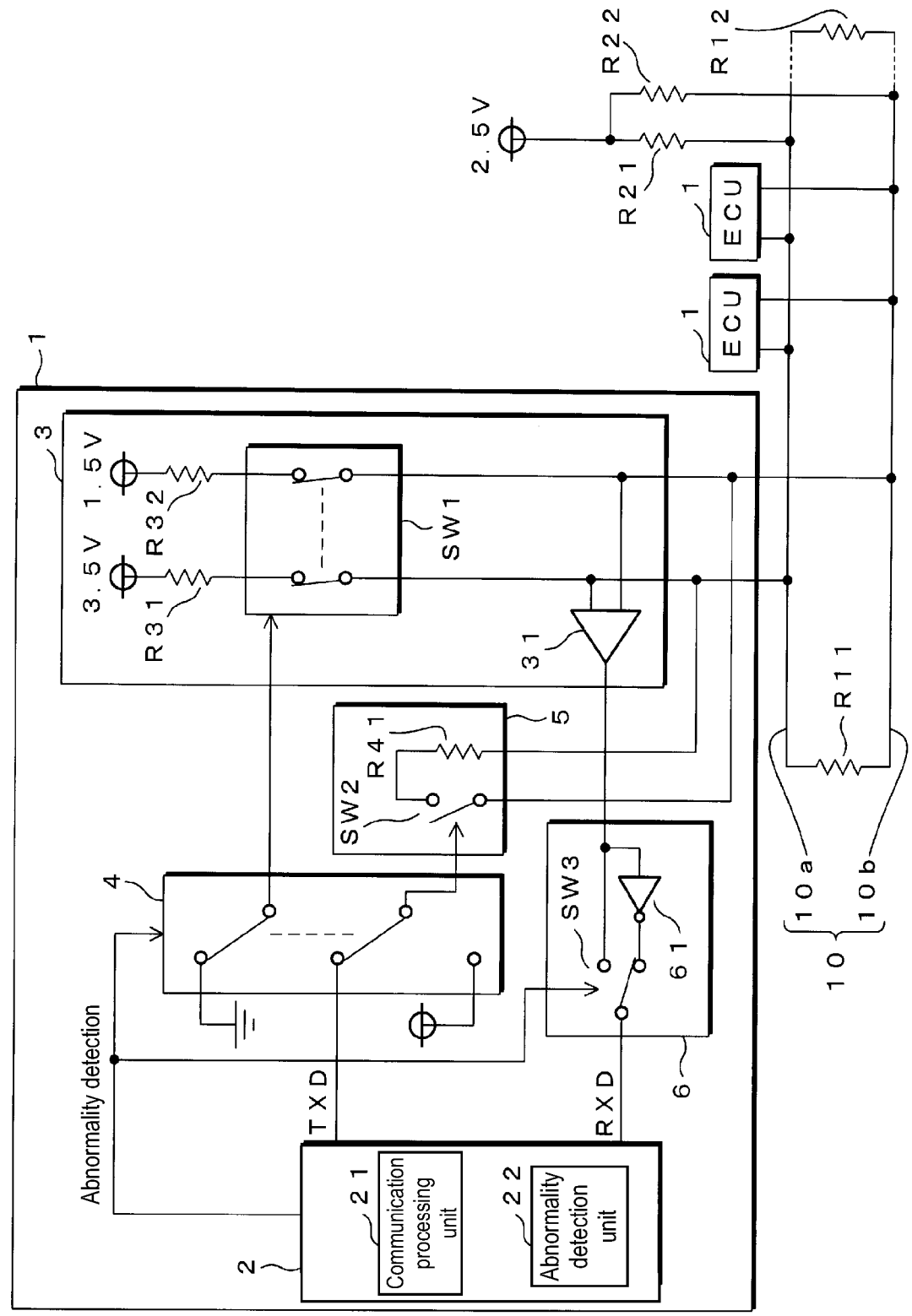
FIG. 2 is a diagram schematically illustrating a switching state of a switch when an abnormality was detected.

FIG. 2 is a diagram schematically illustrating a switched state of the switches when an abnormality has been detected. The ECU 1 of the present embodiment switches, if the abnormality detection unit 22 has detected an abnormality in a message, the switch of the transmission switching circuit 4, the switch SW1 of the communication IC 3, and the switch SW3 of the reception switching circuit 6 to the state shown in FIG. 2. In this state, the first wire 10a of the CAN bus 10 is connected to the potential of 3.5 V via the resistor R31 and the second wire 10b is connected to the potential of 1.5 V via the resistor R32, so that the CAN bus 10 is fixed in a state in which the potential difference is large. Here, since the CAN bus 10 is fixed in a so-called dominant state, a device that only performs communication according to a regular CAN communication scheme, such as a device illegally connected to the CAN bus 10, cannot perform recessive transmission, resulting in failed message transmission.

Furthermore, in the state in which an abnormality in a message has been detected, closing/opening of the switch SW2 of the switch circuit 5 is controlled based on output signals TXD of the control IC 2, and a message is transmitted to the CAN bus 10. In other words, the switch SW2 is switched to the closed state based on a "0" of a transmission message, and the CAN bus 10 takes on a state in which the potential difference is small, and the switch SW2 is switched to the open state based on the transmission message data "1", and the CAN bus 10 takes on a state in which the potential difference is large.

Note however that the relationship between a "0" and a "1" of a message, and the magnitudes of the potential difference of the CAN bus 10 in the state in which a message abnormality has been detected is inverted with respect to the state in which a message abnormality has not been detected. Accordingly, in the state in which a message abnormality has been detected, a signal obtained by the inverter 61 of the reception switching circuit 6 inverting an output of the comparator 31 is input as an input signal RXD to the control IC 2, and a received message is obtained by the control IC 2.

As a result of all of the authorized ECUs 1 connected to the CAN bus 10 executing such switching of the message transmitting and receiving method based on abnormality detection, it is possible to block unauthorized message transmission performed by a device illegally connected to the CAN bus 10 but continue transmission and reception of messages to/from the authorized ECUs 1 even after an abnormality was detected.

The communication system according to Embodiment 1 that has the above-described configuration connects the plurality of ECUs 1 to each other via the two-wire CAN bus 10, and the plurality of ECUs 1 transmit and receive messages using a differential communication scheme by assigning a first state in which the first wire 10a and the second wire 10b of the CAN bus 10 have a large potential difference to a first value (a "0") of the message, and assigning a second state in which the first wire 10a and the second wire 10b have a small potential difference to a second value (a "1") of the message.

The second state in which the potential difference is small is realized since the first wire 10a and the second wire 10b of the CAN bus 10 are connected to the common potential (2.5 V) via the resistors R21 and R22. This second state corresponds to a "recessive value (recessive)" of the CAN communication scheme, and is assigned to "1" of the message. When transmitting a "0" of the message, an ECU 1 connected to the CAN bus 10 closes the switch SW1 of the communication IC 3 to connect the first wire 10a of the CAN bus 10 to the first potential (3.5 V), which is higher than the common potential, and connect the second wire 10b to the second potential (1.5 V), which is lower than the common potential, thereby bringing the CAN bus 10 into the first state in which the potential difference is large. This first state corresponds to a "dominant value (dominant)" of the CAN communication scheme, and is assigned to "0" of the message.

In the communication system according to the present embodiment, the ECUs 1 include the abnormality detection unit 22 configured to detect an abnormality in a message transmitted to the CAN bus 10. In Embodiment 1, all of the ECUs 1 connected to the CAN bus 10 include such an abnormality detection unit 22. Note that the abnormality detection unit 22 may perform any abnormality detection method. An abnormality detection signal that indicates whether or not an abnormality has been detected by the abnormality detection unit 22 is given from the control IC 2 to the transmission switching circuit 4 and the reception switching circuit 6.

Furthermore, the ECU 1 controls the switch SW2, which connects and disconnects the first wire 10a and the second wire 10b of the CAN bus 10 via the resistor R41, changes the CAN bus 10 fixed to the first state to the second state by closing the switch SW2 so as to bring the CAN bus 10 into the second state in which the potential difference is small, and transmits a "0" of the message that corresponds to the second state. Note, here, that, in contrast to the CAN communication scheme, the first state in which the potential difference of the CAN bus 10 is large corresponds to "recessive", and the second state in which the potential difference is small corresponds to "dominant". Accordingly, the communication system of the present embodiment can transmit, by controlling the switch SW2, a message to the CAN bus 10 fixed to the first state even after an abnormality has been detected.

Furthermore, in a state in which no abnormality has been detected by the abnormality detection unit 22, the ECU 1 of the present embodiment controls closing/opening of the switch SW1 so that the CAN bus 10 takes on the first state in which the potential difference is large if data of a transmission message is "0", and the CAN bus 10 takes on the second state in which the potential difference is small if the transmission message data is "1". The switch SW2 is set in the open state. In contrast, if an abnormality has been detected by the abnormality detection unit 22, the ECU 1 controls closing/opening of the switch SW2 so that the CAN bus 10 takes on the second state in which the potential difference is small if data of a transmission message is "0", and the CAN bus 10 takes on the first state in which the potential difference is large if the transmission message data is "1". The switch SW1 is fixed to the closed state. With these measures, the ECU 1 can transmit a message by assigning a "0" of the transmission message to the dominant state of the CAN bus 10, and a "1" to the recessive state.

Furthermore, in the ECU 1 of the present embodiment, the communication processing unit 21 of the control IC 2 sequentially outputs data constituting a transmission message as output signals TXD, and the transmission switching circuit 4 switches the output destination of the output signals TXD between the switch SW1 and the switch SW2, based on whether or not an abnormality has been detected by the abnormality detection unit 22. Accordingly, it is possible to easily and reliably switch control of the state of the CAN bus 10 based on the value of the data constituting a transmission message, depending on whether or not an abnormality has been detected by the abnormality detection unit 22.

Furthermore, in the communication system of the present embodiment, depending on whether or not an abnormality has been detected by the abnormality detection unit 22, the relationship between dominant and recessive of the first state and the second state of the CAN bus 10 is inverted, and the correspondence relationship between a "0" and a "1" constituting a transmission message, and the first and second states of the CAN bus 10 is also inverted. Accordingly, when comparing the potentials of the CAN bus 10 using the comparator 31 and receiving a message, the ECU 1 inverts, using the inverter 61, the logic of a value output from the comparator 31 depending on whether or not an abnormality has been detected. Accordingly, the control IC 2 of the ECU 1 can obtain received messages of the same logic, regardless of whether or not an abnormality has been detected.

Note that, in the present embodiment, the ECUs 1 are used as communication devices connected to the CAN bus 10, but the present disclosure is not limited to them. The communication devices that are connected to the CAN bus 10 and transmit and receive messages may also be of any other type besides ECUs 1. Furthermore, the numerical values such as the voltage values and the resistance values that are used in the present embodiment are given as examples, and the present disclosure is not limited to them. Furthermore, the circuit configurations shown in FIGS. 1 and 2 are schematic, and the circuit configuration of the ECU 1 is not limited to that shown in the drawings. Any circuit configuration may be used as long as it realizes the same functions, and the same functions may also be realized by software. Furthermore, the control IC 2 and the communication IC 3 do not necessarily have to be provided as ICs, and circuits having the same functions may also be configured on a circuit board. Furthermore, all of the authorized ECUs 1 connected to the CAN bus 10 are configured to have the abnormality detection function and the switching control function, but the present disclosure is not limited to this. It is sufficient that at least two of the plurality of ECUs 1 connected to the CAN bus 10 are configured to have the above-described functions.

Furthermore, the ECU 1 may return to the original state, for example, at any timing and on any condition, after the abnormality detection unit 22 has detected an abnormality and the transmission switching circuit 4 and the reception switching circuit 6 have been switched. For example, a configuration is possible in which the ECU 1 returns to the original state when an ignition (IG) switch of the vehicle is switched from an ON state to an OFF state, or a configuration is also possible in which the ECU 1 returns to the original state when, for example, a predetermined time period has elapsed. Furthermore, a configuration is also possible in which, for example, the ECU 1 does not return to the original state, and only returns to the original state when it is confirmed that a specific measure has been conducted at a dealer of the vehicle or the like. In this configuration, the fact that the abnormality detection unit 22 has detected an abnormality is preferably stored in a non-volatile memory or the like.

Embodiment 2

In the above-described embodiment, all of the ECUs 1 connected to the CAN bus 10 are configured to perform abnormality detection, but the present disclosure is not limited to this.

In a communication system according to Embodiment 2, only one of ECUs 1 includes an abnormality detection unit 22 to perform abnormality detection, and performs, if having detected an abnormality, processing of notifying the other ECUs 1 of that fact. Any abnormality notification method may be used.

For example, the ECU 1 that includes the abnormality detection unit 22 performs, if an abnormality has been detected, switching of the transmission switching circuit 4 and the reception switching circuit 6, and thereby the CAN bus 10 is fixed to the first state in which the potential difference is large. In this state, other ECUs 1 cannot transmit a message, and thus, if this state is maintained for a predetermined time period, it can also be defined as an abnormality notification of the other ECUs 1. Furthermore, a configuration is also possible in which, for example, the ECU 1 that includes the abnormality detection unit 22 fixes, if an abnormality is detected, the CAN bus 10 to the first state in which the potential difference is large, and then controls the switch SW2 to perform a predetermined message transmission, thereby notifying the other ECUs 1 of the abnormality.

Figure 3:
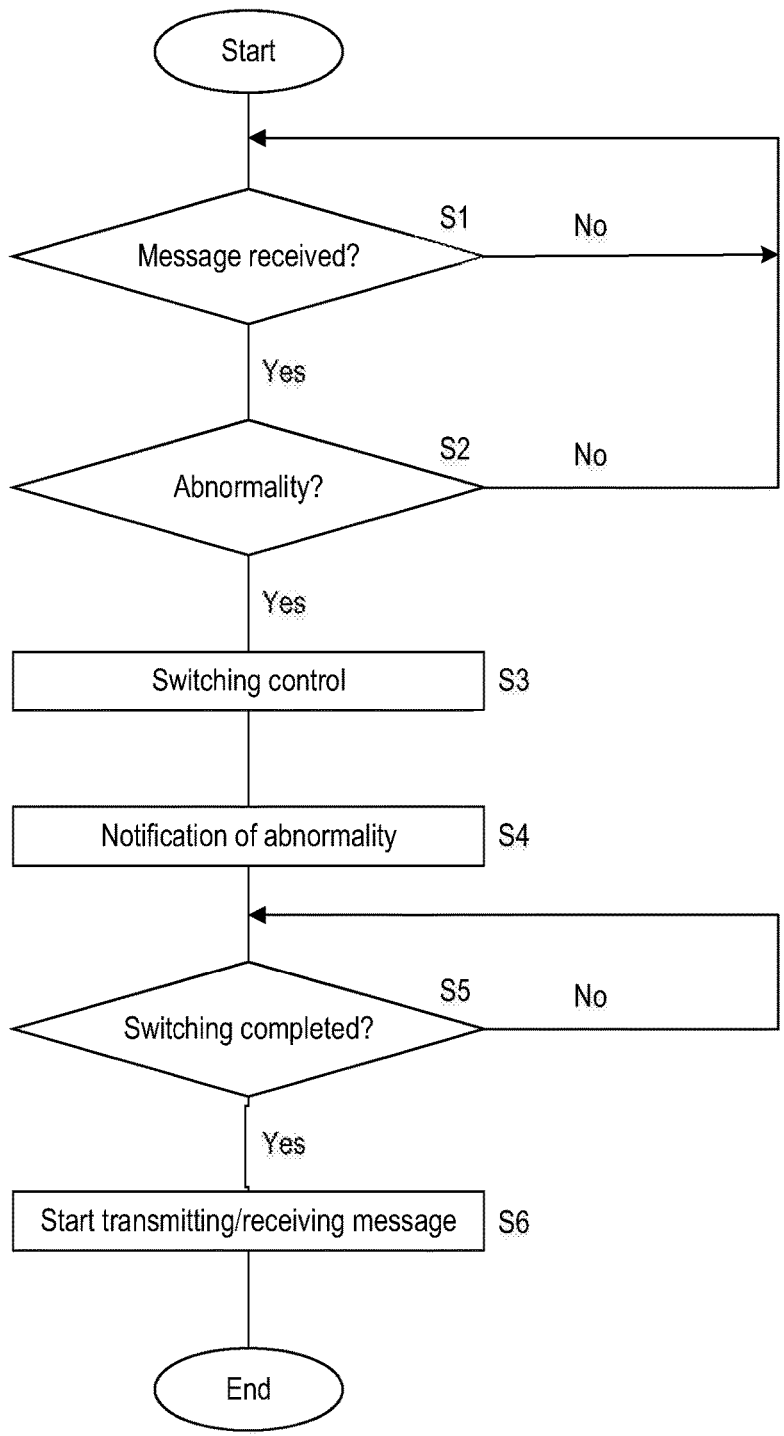
FIG. 3 is a flowchart illustrating a procedure of processing that is executed by an ECU that includes an abnormality detection unit according to Embodiment 2.

FIG. 3 is a flowchart illustrating a procedure of processing that is executed by the ECU 1 that includes the abnormality detection unit 22 according to Embodiment 2. The communication processing unit 21 of the control IC 2 of the ECU 1 that includes the abnormality detection unit 22 determines whether or not, based on input signals RXD from the communication IC 3, a message has been received (step S1). If no message has been received (NO in step S1), the communication processing unit 21 of the control IC 2 stands by until a message is received. If a message has been received (YES in step S1), the abnormality detection unit 22 of the control IC 2 determines whether or not the received message is abnormal (step S2). If the received message is not abnormal (No in step S2), the control IC 2 returns to the processing in step S1. If the received message is abnormal (YES in step S2), the control IC 2 controls switching of the transmission switching circuit 4 and the reception switching circuit 6 using an abnormality detection signal (step S3). Then, the control IC 2 notifies the other ECUs 1 that do not include an abnormality detection unit 22 of the fact that an abnormality has been detected (step S4).

Upon being notified of the abnormality, the other ECUs 1 control switching, and transmit a notification of completion of the switching. The control IC 2 determines whether or not such switching completion notifications have been received from all of the other ECUs 1 from which such notifications are expected to be received (step S5). If no switching completion notification has been received from at least one other ECU 1 (NO in step S5), the control IC 2 stands by until switching completion notifications are received from all of the other ECUs 1. If switching completion notifications have been received from all of the other ECUs 1 (YES in step S5), the communication processing unit 21 of the control IC 2 starts transmitting/receiving a message to/from the other ECUs 1 (step S6), and the processing is ended.

Figure 4:
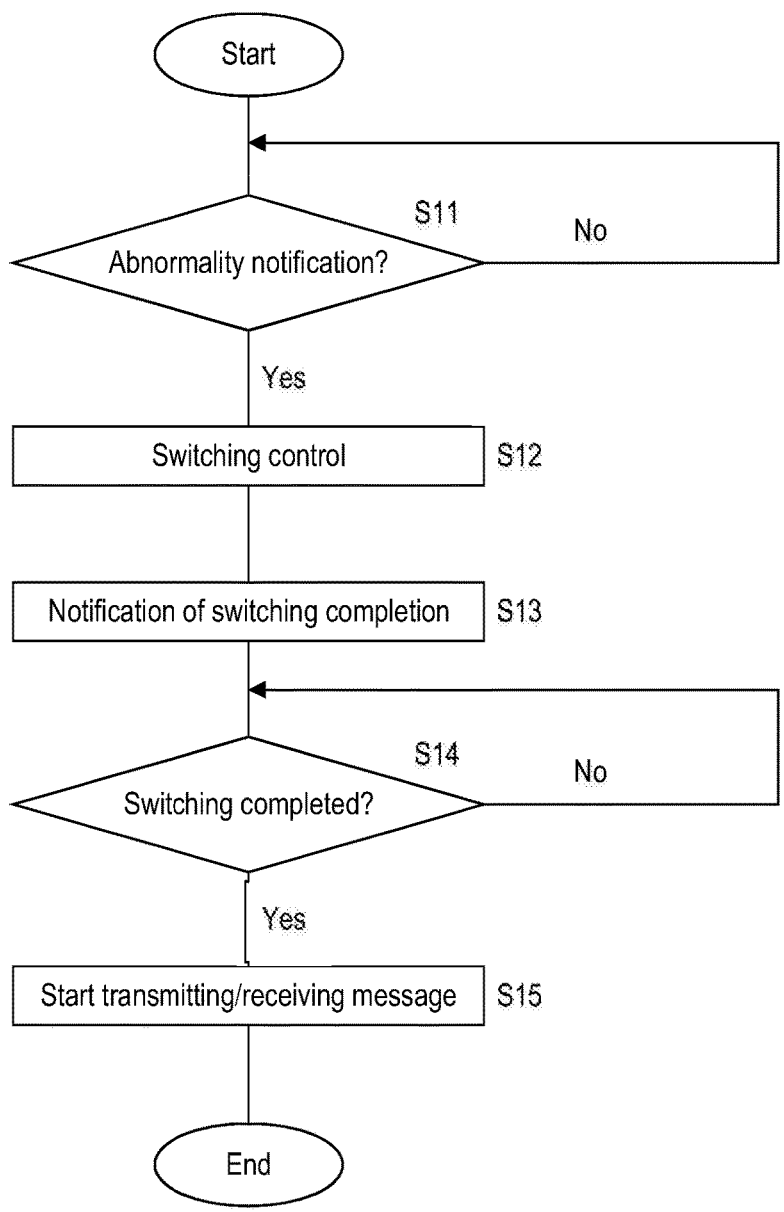
FIG. 4 is a flowchart illustrating a procedure of processing that is executed by an ECU that does not include an abnormality detection unit according to Embodiment 2.

FIG. 4 is a flowchart illustrating a procedure of processing that is executed by an ECU 1 that does not include an abnormality detection unit 22 according to Embodiment 2. The control IC 2 of the ECU 1 that does not include an abnormality detection unit 22 determines whether or not an abnormality notification has been received from the ECU 1 that includes the abnormality detection unit 22 (step S11). If no abnormality notification has been received (NO in step S11), the control IC 2 stands by until an abnormality notification is received. If an abnormality notification has been received (YES in step S11), the control IC 2 controls switching of the transmission switching circuit 4 and the reception switching circuit 6 using an abnormality detection signal (step S12). After the switching control has been completed, the control IC 2 transmits, to the other ECUs 1, a notification that switching control is completed (step S13).

Then, the control IC 2 determines whether or not such switching completion notifications, each of which is transmitted by another ECU 1 that does not include an abnormality detection unit 22, have been received from all of the ECUs 1 from which such notifications are expected to be received (step S14). If a switching completion notification has not been received from at least one other ECU 1 (NO in step S14), the control IC 2 stands by until switching completion notifications are received from all of other ECUs 1. If switching completion notifications have been received from all of other ECUs 1 (YES in step S14), the communication processing unit 21 of the control IC 2 starts message transmission and reception to and from the other ECUs 1 (step S15), and the processing is ended.

The communication system according to Embodiment 2 that has the above-described configuration has a configuration in which an ECU 1 that includes an abnormality detection unit 22 notifies the other ECUs 1 that do not include an abnormality detection unit 22 of the fact that an abnormality has been detected. Accordingly, it is not necessary to perform abnormality detection on all of ECUs 1 connected to the CAN bus 10, and thus it is possible to reduce the cost of ECUs 1 that do not include an abnormality detection unit 22, and to reduce the cost of the communication system as a whole. Note that the present embodiment has a configuration in which ECUs 1 that were notified of an abnormality transmit a switching completion notification, but the present disclosure is not limited to this. A configuration is also possible in which, upon having completed switching, ECUs 1 start message transmission and reception, without transmitting a switching completion notification.

Furthermore, other configurations of the communication system according to Embodiment 2 are the same as those of the communication system according to Embodiment 1, and thus the same reference numerals are given to the same portions, and detailed descriptions are omitted.

Embodiment 3

Figure 5:
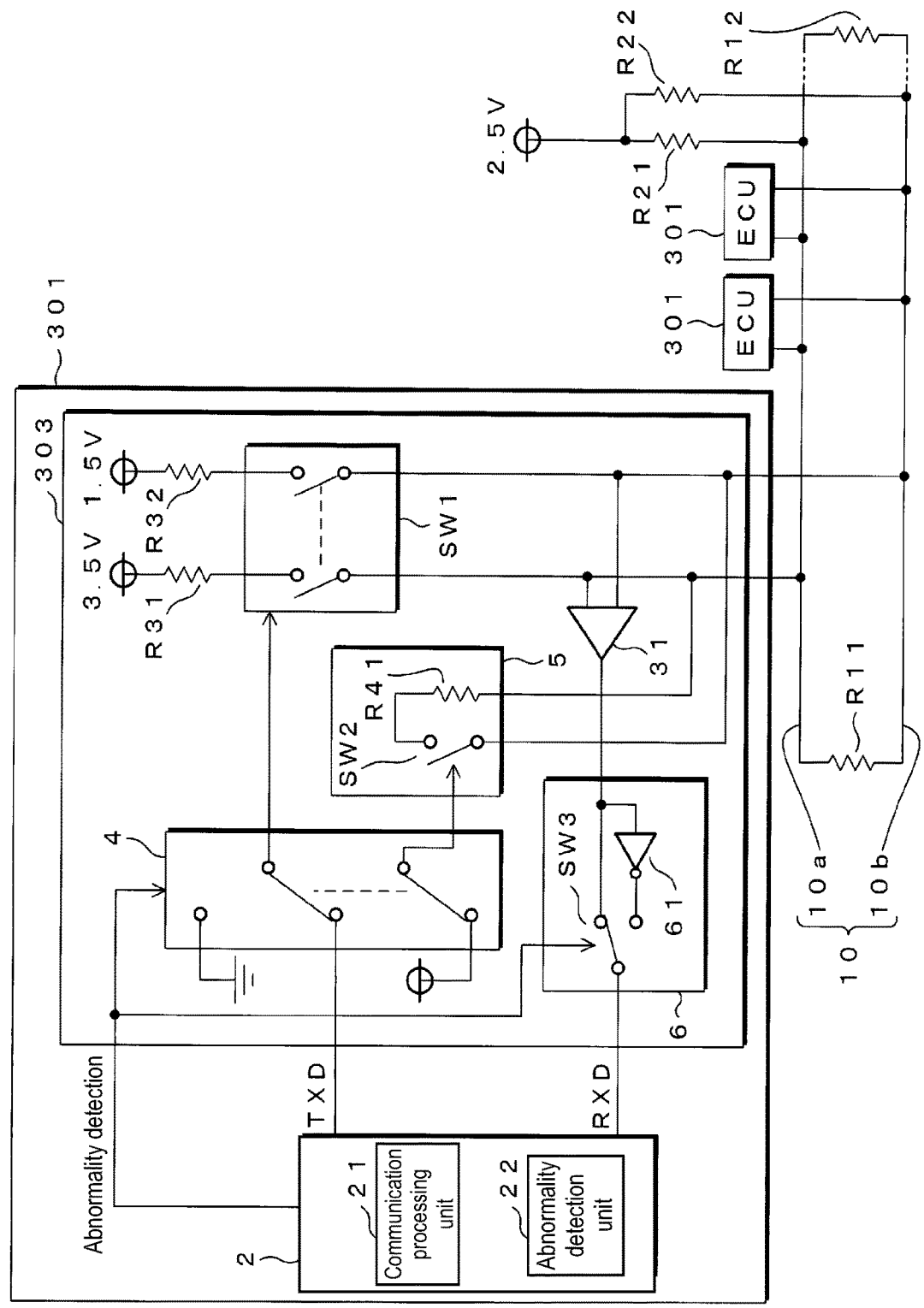
FIG. 5 is a diagram schematically illustrating a configuration of a communication system according to Embodiment 3.

FIG. 5 is a diagram schematically illustrating a configuration of a communication system according to Embodiment 3. An ECU 301 of the communication system according to Embodiment 3 is provided with a communication IC 303 that includes, in addition to resistors R31 and R32, a switch SW1, and a comparator 31, the transmission switching circuit 4, the switch circuit 5, and the reception switching circuit 6, the communication IC 303 being implemented as a single IC. An output signal TXD and an abnormality detection signal that are output from the control IC 2 are input to the communication IC 303, and a signal output from the communication IC 303 is input as an input signal RXD to the control IC 2. The operations of the circuits within the communication IC 303 are the same as those described with reference to Embodiment 1.

By providing the communication IC 303 that includes the transmission switching circuit 4, the switch circuit 5, and the reception switching circuit 6 in this way, it is possible to easily realize the function that the ECU 301 of the communication system of the present embodiment should have, as long as the communication system includes a means for detecting a message abnormality. Note that Embodiment 3 has a configuration in which the communication IC 303 includes the transmission switching circuit 4, the switch circuit 5, and the reception switching circuit 6, but the communication IC 303 may also be configured to include at least one of these circuits, instead of all of these circuits. Furthermore, the communication system may also be configured to include at least one ECU 1 according to Embodiment 1 and at least one ECU 301 according to Embodiment 3 in a mixed manner.

Furthermore, other configurations of the communication system according to Embodiment 3 are the same as those of the communication system according to Embodiment 1, and thus the same reference numerals are given to the same portions, and detailed descriptions are omitted.

Embodiment 4

Figure 6:
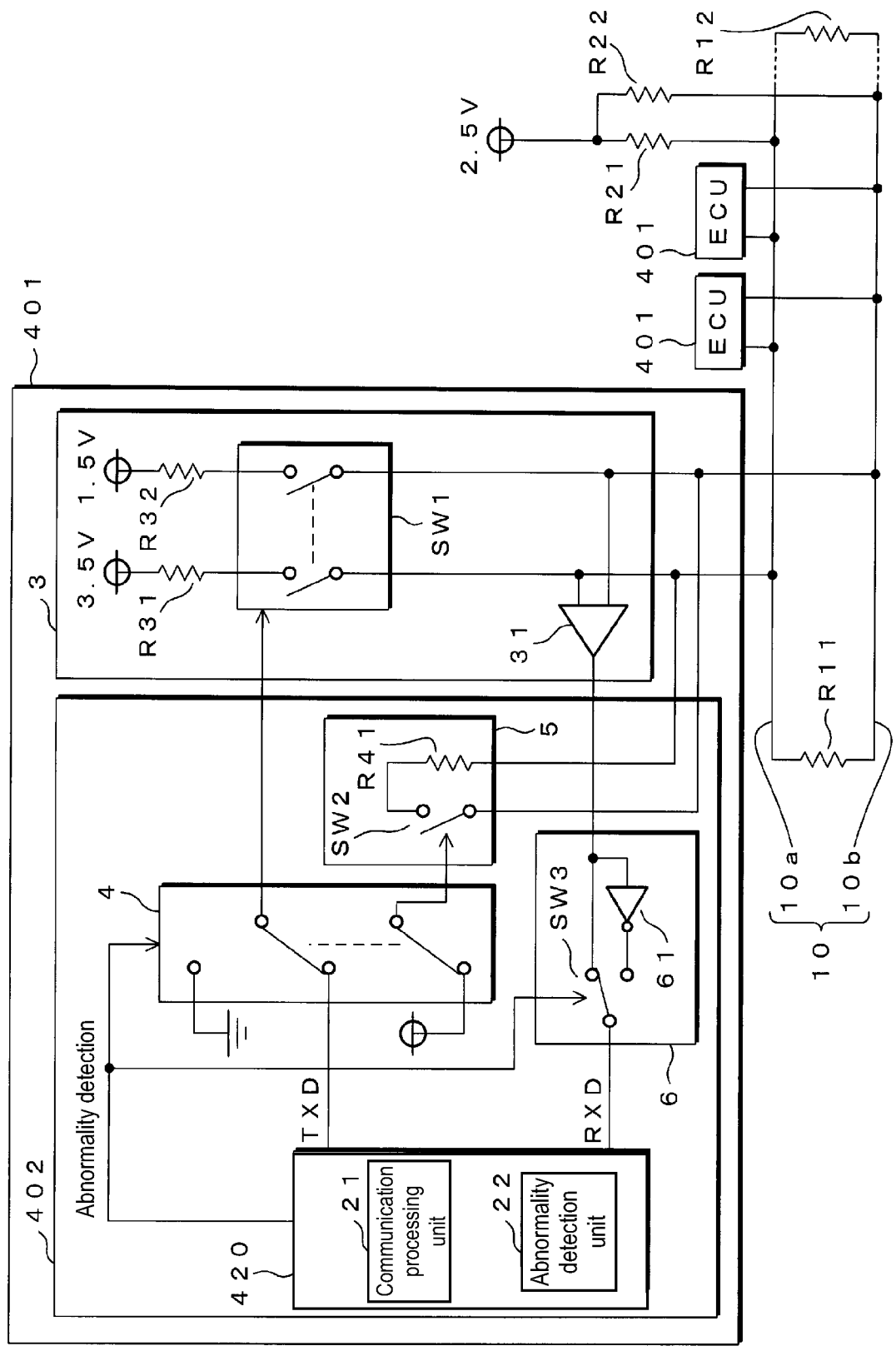
FIG. 6 is a diagram schematically illustrating a configuration of a communication system according to Embodiment 4.

FIG. 6 is a diagram schematically illustrating a configuration of a communication system according to Embodiment 4. An ECU 401 of the communication system according to Embodiment 4 is provided with a control IC 402 that includes a control circuit 420, which has the function corresponding to the control IC 2 of the ECU 1 according to Embodiment 1, the transmission switching circuit 4, the switch circuit 5, and the reception switching circuit 6, the control IC 402 being implemented as a single IC. A signal for controlling closing/opening of a switch SW1 is input from the control IC 402 to the communication IC 3, and an output signal of the comparator 31 is input from the communication IC 3 to the control IC 402. Furthermore, the control IC 402 is also connected to the first wire 10*a* and the second wire 10*b* of the CAN bus 10, and the first wire 10*a* and the second wire 10*b* are connected and disconnected to and from each other by the switch circuit 5.

As described above, by providing the control IC 402 that includes the transmission switching circuit 4, the switch circuit 5, and the reception switching circuit 6, it is possible to combine the communication IC 3 such as a CAN controller, which performs communication using a CAN communication, with the control IC 402, easily realizing the ECU 401 of the communication system according to the present embodiment. Note that Embodiment 4 has a configuration in which the control IC 402 includes the transmission switching circuit 4, the switch circuit 5, and the reception switching circuit 6, but the control IC 402 may also be configured to include at least one of these circuits, instead of all of these circuits. Furthermore, the communication system may also be configured to include at least one ECU 1 according to Embodiment 1 and at least one ECU 401 according to Embodiment 4 in a mixed manner.

Furthermore, other configurations of the communication system according to Embodiment 4 are the same as those of the communication system according to Embodiment 1, and thus the same reference numerals are given to the same portions, and detailed descriptions are omitted.

Embodiment 5

Figure 7:
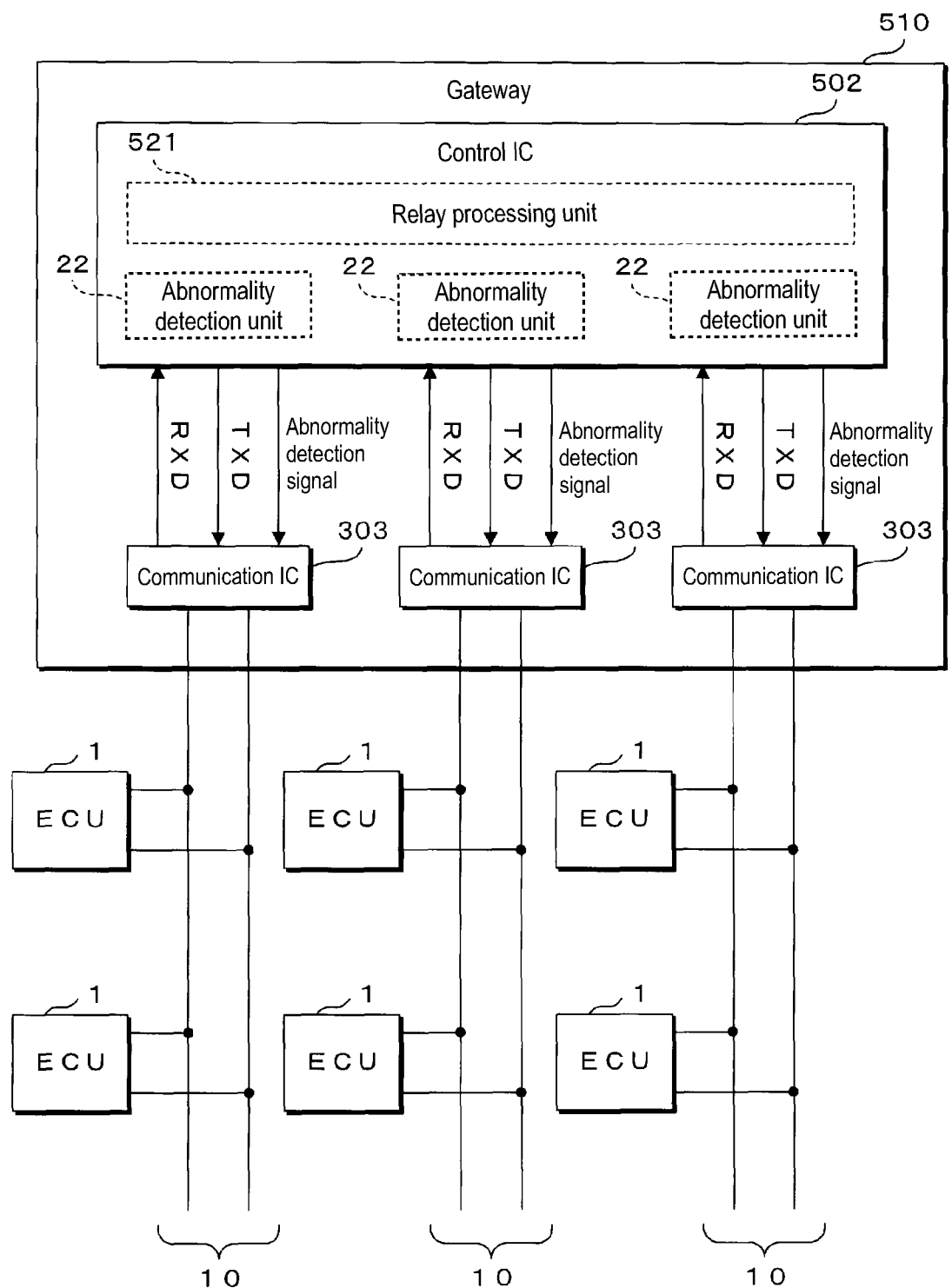
FIG. 7 is a diagram schematically illustrating a configuration of a communication system according to Embodiment 5.

FIG. 7 is a diagram schematically illustrating a configuration of a communication system according to Embodiment 5. The communication system according to Embodiment 5 is provided with a gateway 510 to which three CAN buses 10 are connected, and that relays message transmission and reception between the CAN buses 10. The gateway 510 is configured to include one control IC 502, and three communication ICs 303. Note that each of the communication ICs 303 provided in the gateway 510 of Embodiment 5 corresponds to the communication IC 303 provided in the above-described ECU 1 according to Embodiment 3, and includes the transmission switching circuit 4, the switch circuit 5, and the reception switching circuit 6. This is to simplify the description of FIG. 7, and the gateway 510 may also be configured using the communication IC 3 according to Embodiment 1.

One CAN bus 10 is connected to each of the three communication ICs 303 of the gateway 510, and each communication IC 303 transmits or receives messages to or from an ECU 1 via the connected CAN bus 10. Output signals TXD and abnormality detection signals are input to the communication ICs 303 from the control IC 502, and the communication ICs 303 transmit input signals RXD that correspond to a received message to the control IC 502. Transmission and reception of the three types of signals between the communication ICs 303 and the control IC 502 are performed individually.

The control IC 502 includes a relay processing unit 521 and abnormality detection units 22. The relay processing unit 521 performs processing for relaying messages between the CAN buses 10 by transmitting messages received by a communication IC 303 from another communication IC 303. The relay processing unit 521 executes processing for generating transmission messages and giving output signals TXD to a communication IC 303, and processing for obtaining input signals RXD from a communication IC 303 and receiving messages.

Furthermore, the control IC 502 is provided with abnormality detection units 22 for the respective communication ICs 303, and each abnormality detection unit 22 determines, for the corresponding CAN bus 10, whether or not a message is abnormal. If having detected a message abnormality, the abnormality detection unit 22 notifies the corresponding communication IC 303 of the abnormality with an abnormality detection signal. The communication IC 303 controls switching of the transmission switching circuit 4, the switch circuit 5, and the reception switching circuit 6 that are provided inside thereof, based on the abnormality detection signal output from the control IC 502.

In the communication system of Embodiment 5, if an abnormality has been detected in any one of the CAN buses 10, regular communication according to the CAN communication scheme is blocked with respect to this CAN bus 10, and regular communication according to the CAN communication scheme is continuously executed with respect to the CAN buss 10 on which no abnormality has been detected.

Note, however, that a configuration is also possible in which, in the gateway 510, a common signal is input to the three communication ICs 303 as an abnormality detection signal, and if an abnormality has been detected in any one of the CAN buses 10, regular communication according to the CAN communication scheme is blocked with respect to all of the CAN buses 10. Note, however, that, in this case, ECUs 1 that are connected to the CAN buses 10 other than the CAN bus 10 on which an abnormality has been detected cannot detect an abnormality, and thus the gateway 510 needs to notify them of the fact that an abnormality has been detected, as in the ECU 1 according to Embodiment 2. In any case, in the communication system of Embodiment 5, the configuration in which, instead of the ECUs 1, the gateway 510 has the abnormality detection function and notifies the ECUs 1 of the fact that an abnormality has been detected, that is, the same configuration as that in Embodiment 2, is advantageous.

Note that other configurations of the communication system according to Embodiment 5 are the same as those of the communication system according to Embodiment 3, and thus the same reference numerals are given to the same portions, and detailed descriptions are omitted.

Embodiment 6

Figure 8:
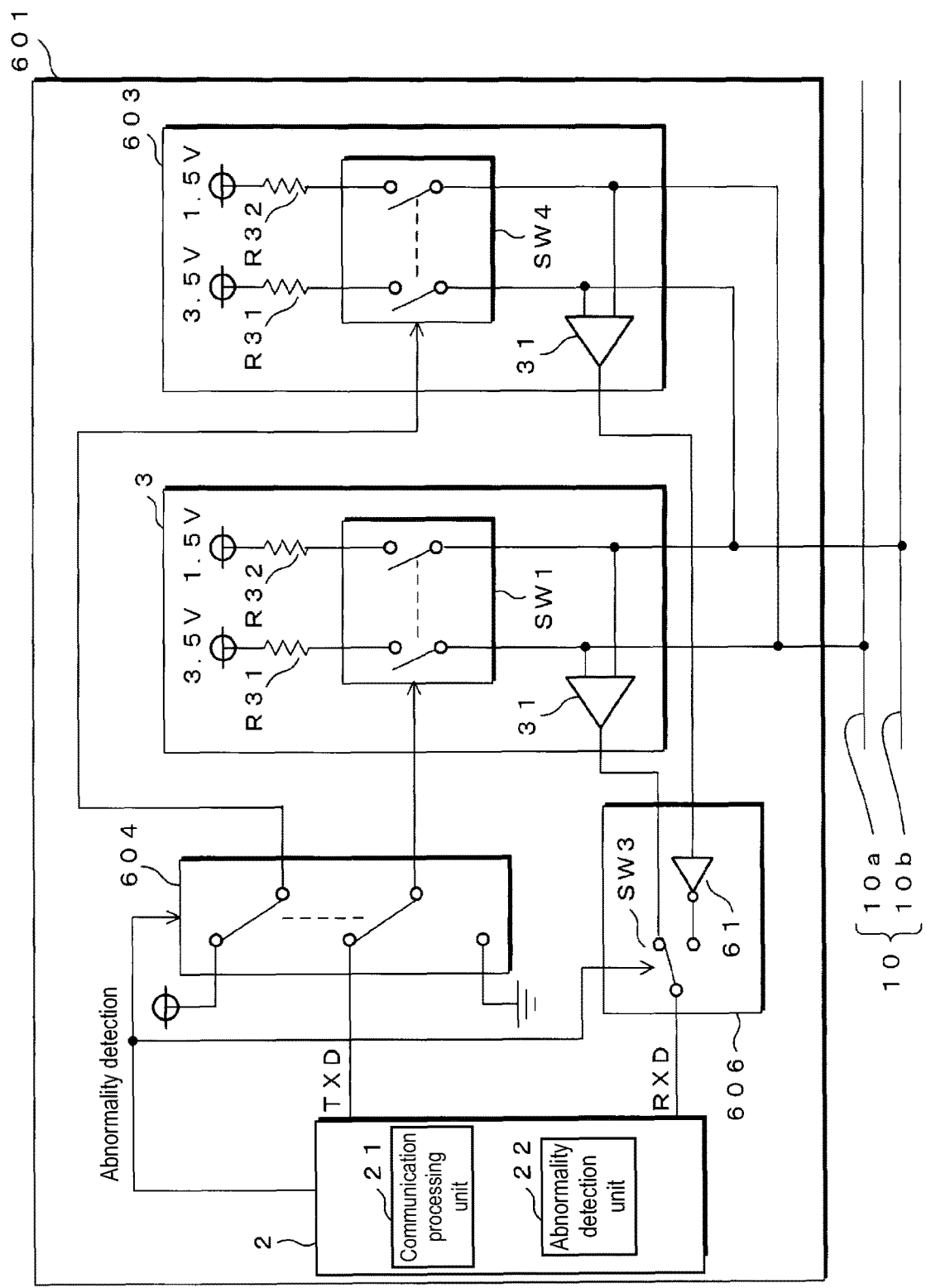
FIG. 8 is a diagram schematically illustrating a configuration of a communication system according to Embodiment 6.
Figure 9:
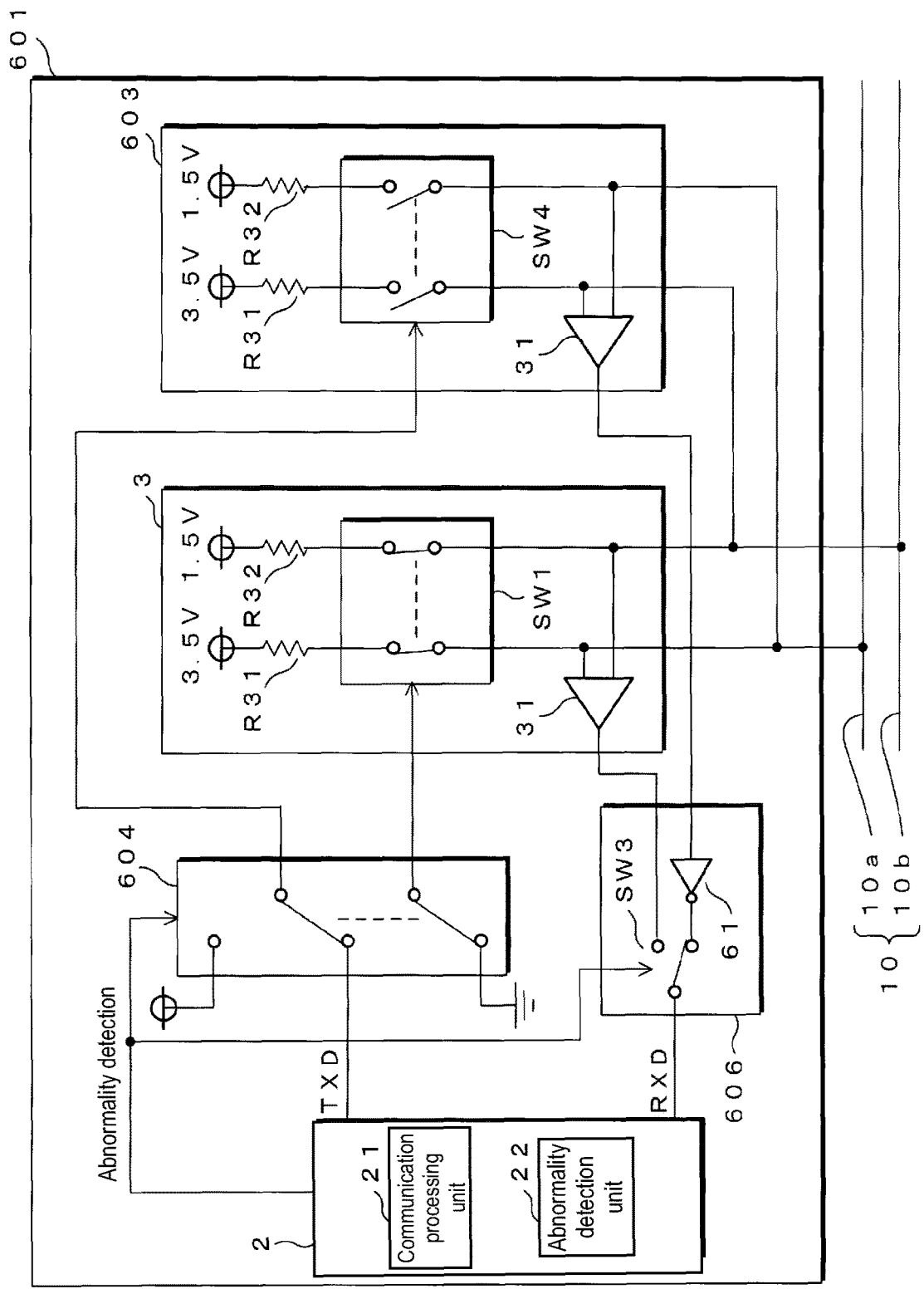
FIG. 9 is a diagram schematically illustrating a configuration of the communication system according to Embodiment 6.

FIGS. 8 and 9 are diagrams schematically illustrating a configuration of a communication system according to Embodiment 6. Note that FIG. 8 shows a switched state of switches when no abnormality has been detected, and FIG. 9 shows a switched state of the switches when an abnormality has been detected. Also, in FIGS. 8 and 9, the other ECUs shown in, for example, FIGS. 1 and 2, and the resistors R11, R12, R21, R22, and the like that are connected to the CAN bus 10 are not shown.

The communication system according to Embodiment 6 differs from Embodiments 1 to 5 in the configuration relating to message transmission after an abnormality has been detected. An ECU 601 of the communication system of Embodiment 6 includes two communication ICs 3 and 603. The first communication IC 3 is the same as the communication IC 3 of the ECU 1 according to Embodiment 1 that is shown in e.g. FIGS. 1, 2, and is configured to perform message transmission and reception via the CAN bus 10 if no abnormality has been detected.

In contrast, the second communication IC 603 is configured to perform message transmission and reception via the CAN bus 10 after an abnormality has been detected. Note, however, that the first communication IC 3 and the second communication IC 603 may be the same ICs. In other words, as in the first communication IC 3, the second communication IC 603 is configured to include resistors R31 and R32, a switch SW4 (which may be the same as the switch SW1 of the communication IC 3 but is distinguished by adding the reference numeral "SW4", for convenience), and a comparator 31.

The first communication IC 3 and the second communication IC 603 are connected to the first wire 10a and the second wire 10b that constitute the CAN bus 10 in an inverted manner with respect to each other. In other words, the first communication IC 3 is configured to, if the switch SW1 is switched into a conductive state, connect the first wire 10a of the CAN bus 10 to a first potential (3.5 V), which is higher than a reference potential (2.5 V), via the resistor R31 and connect the second wire 10b to a second potential (1.5 V), which is lower than the reference potential, via the resistor R32. In contrast, the second communication IC 603 is configured to, if the switch SW4 is switched into a conductive state, connect the second wire 10b of the CAN bus 10 to the first potential (3.5 V), which is higher than the reference potential (2.5 V), via the resistor R31 and connect the first wire 10a to the second potential (1.5 V), which is lower than the reference potential via the resistor R32.

The switch SW1 of the first communication IC 3 and the switch SW4 of the second communication IC 603 are switched between closed and open states based on the value of input data. In the present embodiment, the switches SW1 and SW4 are switched to the closed state if a "0" is input, and are switched to the open state if a "1" is input.

The comparators 31 of the first communication IC 3 and the second communication IC 603 each compare the potential of the first wire 10a of the CAN bus 10 with the potential of the second wire 10b, determines whether or not the potential difference exceeds a threshold, and outputs a result of the determination. In the present embodiment, the comparators 31 output a "0" if the potential difference of the CAN bus 10 is large, and output a "1" if the potential difference is small.

Furthermore, the ECU 601 of Embodiment 6 includes a transmission switching circuit 604 and a reception switching circuit 606. The transmission switching circuit 604 is a circuit for switching an input signal between the first communication IC 3 and the second communication IC 603 based on an abnormality detection signal output by the control IC 2. If no abnormality has been detected as shown in FIG. 8, the transmission switching circuit 604 inputs output signals TXD from the control IC 2 to the first communication IC 3 to give a transmission message to the first communication IC 3, and causes the first communication IC 3 to transmit the message to another ECU. In this case, the transmission switching circuit 604 inputs the potential that corresponds to a "1" to the second communication IC 603, and brings the switch SW4 included in the second communication IC 603 into the open state.

In contrast, if an abnormality has been detected as shown in FIG. 9, the transmission switching circuit 604 inputs the potential that corresponds to a "0" to the first communication IC 3, and brings the switch SW1 included in the first communication IC 3 into the closed state. As a result of the switch SW1 being maintained in the closed state, the first wire 10a of the CAN bus 10 has the potential of 3.5 V, and the second wire 10b has the potential of 1.5 V. Accordingly, the CAN bus 10 will be maintained in the state in which the potential difference between the first wire 10a and the second wire 10b is equal to 2.0 V, that is, in the first state in which the potential difference is large.

Furthermore, if an abnormality has been detected, the transmission switching circuit 604 inputs output signals TXD from the control IC 2 to the second communication IC 603 to give a transmission message to the second communication IC 603, and causes the second communication IC 603 to transmit the message to another ECU. If the value of the transmission message is a "1", the switch SW4 of the second communication IC 603 is in the open state, and the CAN bus 10 is maintained, through the first communication IC 3, in the first state in which the potential difference is large, as described above.

If the value of the transmission message is a "0", the switch SW4 of the second communication IC 603 is in the conductive state. Accordingly, the first wire 10a of the CAN bus 10 is connected, through the first communication IC 3, to the potential of 3.5 V via the resistor R31, and is connected, through the second communication IC 603, to the potential of 1.5 V via the resistor R32. Assume, here, that the resistance values of the resistor R31 and the resistance value of the resistor R32 are almost equal to each other, the potential of the first wire 10a of the CAN bus 10 is equal to about 2.5 V. Similarly, the second wire 10b of the CAN bus 10 is connected, through the first communication IC 3, to the potential of 1.5 V via the resistor R32, and is connected, through the second communication IC 603, to the potential of 3.5 V via the resistor R31, and thus the potential thereof is equal to about 2.5 V. Accordingly, the first wire 10a and the second wire 10b of the CAN bus 10 both have the potential of about 2.5 V, and the CAN bus 10 is in the second state in which the potential difference is small.

The reception switching circuit 606 is configured to include an inverter 61 and a switch SW3. To the reception switching circuit 606, a signal output from the comparator 31 of the first communication IC 3, that is, a signal output in response to a message received from the first communication IC 3, and a signal output from the comparator 31 of the second communication IC 603, that is, a signal output in response to a message received from the second communication IC 603 are input.

The switch SW3 of the reception switching circuit 606 selects, based on an abnormality detection signal output from the control IC 2, an input signal from the first communication IC 3 or a signal obtained by the inverter 61 inverting an input signal from the second communication IC 603, and outputs the selected signal. If no abnormality has been detected, as shown in FIG. 8, the reception switching circuit 606 inputs a signal from the first communication IC 3 as an input signal RXD to the control IC 2. If an abnormality has been detected, as shown in FIG. 9, the reception switching circuit 606 inputs, to the control IC 2, a signal obtained by the inverter 61 inverting the logic of the signal from the second communication IC 603, as an input signal RXD.

If the abnormality detection unit 22 has not detected an abnormality in a message on the CAN bus 10, the ECU 601 of Embodiment 6 switches the switch of the transmission switching circuit 604 and the switch SW3 of the reception switching circuit 606 to the state shown in FIG. 8. In this state, closing/opening of the switch SW1 of the first communication IC 3 is controlled based on output signals TXD from the control IC 2, a message is transmitted to the CAN bus 10. In other words, the switch SW1 is switched into the closed state based on a "0" of a transmission message and the CAN bus 10 is in a state in which the potential difference is large, and the switch SW1 is switched into the open state based on a "1" of the transmission message and the CAN bus 10 is in a state in which the potential difference is small. Also, in this state, the output of the comparator 31, which compares the potential of the first wire 10a of the CAN bus 10 with the potential of the second wire 10b, of the first communication IC3 is input as input signals RXD to the control IC 2, and a received message is obtained by the control IC 2. The operation of the ECU 601 in this state is the same as the operation of a conventional ECU that performs message transmission and reception in accordance with a CAN communication scheme.

In contrast, if the abnormality detection unit 22 has detected a message abnormality, the ECU 601 switches the switch of the transmission switching circuit 604 and the switch SW3 of the reception switching circuit 606 to the state shown in FIG. 9. In this state, the first wire 10a of the CAN bus 10 is connected to the potential of 3.5 V via the resistor R31 of the first communication IC 3, and the second wire 10b is connected to the potential of 1.5 V via the resistor R32 of the first communication IC 3, and thus the CAN bus 10 is fixed in the state in which the potential difference is large. Here, since the CAN bus 10 is fixed in the so-called dominant state, a device that only performs communication of a regular CAN communication scheme, such as a device illegally connected to the CAN bus 10, cannot perform recessive transmission, resulting in failed message transmission.

Furthermore, in a state in which a message abnormality has been detected, closing/opening of the switch SW4 of the second communication IC 603 is controlled based on the output signal TXD of the control IC 2, and a message is transmitted to the CAN bus 10. In other words, the switch SW4 is switched to the closed state based on a "0" of a transmission message and the CAN bus 10 takes on the state in which the potential difference is small, and the switch SW4 is switched to the open state based on a "1" of the transmission message and the CAN bus 10 takes on the state in which the potential difference is large.

Note, however, that the relationship between a "0" and a "1" of a message, and the magnitudes of the potential difference of the CAN bus 10 in the state in which a message abnormality has been detected is inverted with respect to the state in which a message abnormality has not been detected. Accordingly, in the state in which a message abnormality has been detected, a signal obtained by the inverter 61 of the reception switching circuit 6 inverting an output of the comparator 31 of the second communication IC 603 is input as an input signal RXD to the control IC 2, and a received message is obtained by the control IC 2.

As a result of all of the authorized ECUs 601 connected to the CAN bus 10 executing such switching of the message transmitting and receiving method based on abnormality detection, it is possible to block unauthorized message transmission that is performed by a device illegally connected to the CAN bus 10 but continue transmission and reception of messages to/from the authorized ECUs 601 even after an abnormality was detected.

The communication system according to Embodiment 6 that has the above-described configuration uses, in place of the switch SW2 of the switch circuit 5 of the communication system according to Embodiment 1, the switch SW4 of the second communication IC 603 that is configured to connect the first wire 10a of the CAN bus 10 to the potential of 1.5 V via the resistor R32, and connect the second wire 10b of the CAN bus 10 to the potential of 3.5 V via the resistor R31. If, in a state in which, due to detection of an abnormality by the abnormality detection unit 22, the first wire 10a of the CAN bus 10 is connected to the potential of 3.5 V via the resistor R31 and the second wire 10b is connected to the potential of 1.5 V by the switch SW1 of the first communication IC 3, the switch SW4 of the second communication IC 603 connects the first wire 10a of the CAN bus 10 to the potential of 1.5 V via the resistor R32 and the second wire 10b to the potential of 3.5 V via the resistor R31, the first wire 10a and the second wire 10b of the CAN bus 10 will both have a potential that is substantially intermediate between 3.5 V and 1.5 V, that is, the potential of 2.5 V. In other words, the CAN bus 10 that was fixed to the first state in which the potential difference is large by the switch SW1 of the first communication IC3 can be switched to the second state in which the potential difference is small by the switch SW4 of the second communication IC 603.

Accordingly, the communication system according to Embodiment 6 can transmit a message to the CAN bus 10 fixed to the first state even after an abnormality has been detected, by controlling the switch SW4 of the second communication IC 603.

Furthermore, the ECU 601 according to Embodiment 6 is provided with the two communication ICs, namely, the first communication IC 3 including the switch SW1, and the second communication IC 603 including the switch SW4. The first communication IC 3 and the second communication IC 603 have almost the same configuration, and two communication ICs that are substantially the same are installed in the ECU 601, and one can be set as the first communication IC 3 and the other one can be set as the second communication IC 603. Existing CAN controller ICs or the like may be used as the two communication ICs, and message transmission using the switch SW4 when an abnormality was detected can be realized by using the exiting communication ICs.

Furthermore, in the ECU 601, the first communication IC 3 and the second communication IC 603 each have the comparator 31 for receiving a message. If no abnormality has been detected, a message can be received by the comparator 31 of the first communication IC 3. In the communication system according to Embodiment 6, depending on whether or not an abnormality has been detected by the abnormality detection unit 22, the relationship between dominant and recessive of the first state and the second state of the CAN bus 10 is inverted, and the correspondence relationship between a "0" and a "1" constituting a transmission message, and the first and second states of the CAN bus 10 is also inverted. Accordingly, the ECU 601 inverts, using the inverter 61, the logic of a value output from the comparator 31 of the second communication IC 603, and by performing message reception using a signal output from the inverter 61 if an abnormality has been detected, the ECU 601 can receive a message, regardless of whether or not an abnormality has been detected.

Note that Embodiment 6 has a configuration in which, after the CAN bus 10 has been fixed to the first state in which the potential difference is large by the switch SW1 of the first communication IC 3 upon detection of an abnormality by the abnormality detection unit 22, message transmission is performed using the switch SW4 of the second communication IC 603. Furthermore, Embodiments 1 to 5 have a configuration in which, after the CAN bus 10 has been fixed to the first state in which the potential difference is large by the switch SW1 of the communication IC 3 upon detection of an abnormality by the abnormality detection unit 22, the switch SW2, which is configured to connect the first wire 10*a* and the second wire 10*b* of the CAN bus 10 via the resistor R41, is employed to perform message transmission. However, the method of performing message transmission after the CAN bus 10 has been fixed to the first state upon detection of an abnormality is not limited to them. The switch for performing message transmission after an abnormality has been detected may have any configuration as long as it can switch the CAN bus 10, when it was fixed to the first state by the switch SW1 of the first communication IC 3, between the second state and the first state by switching conduction and interruption.

Furthermore, the communication system according to Embodiment 6 may further employ a configuration of performing a notification of the fact that an abnormality has been detected, as with in the communication system according to Embodiment 2. Furthermore, the communication system according to Embodiment 6 may also employ a configuration of relaying a message between a plurality of CAN buses 10, as with in the gateway 510 according to Embodiment 5.

Furthermore, other configurations of the communication system according to Embodiment 6 are the same as those of the communication system according to Embodiment 1, and thus the same reference numerals are given to the same portions, and detailed descriptions are omitted.

The invention claimed is:

1. A communication system in which a plurality of communication devices are connected to each other via a two-wire bus, the plurality of communication devices being configured to transmit and receive a message using a differential communication scheme by assigning a first state in which a potential difference between a first wire and a second wire of the bus is large and a second state in which the potential difference is small to binary information constituting the message,
wherein the first wire and the second wire are connected to a common potential via respective first resistors,
each of the communication devices includes: a communication processing unit configured to generate a message to be transmitted, and sequentially output binary information constituting the generated message; and a first switch configured to be switched between closed and open states based on the binary information that is output by the communication processing unit, and bring the bus into the first state by connecting the first wire to a first potential, which is larger than the common potential, and connecting the second wire to a second potential, which is smaller than the common potential,
at least one communication device includes an abnormality detection unit configured to detect an abnormality in a message transmitted on the bus,
at least two communication devices including the at least one communication device include: a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state by connecting the first wire and the second wire via a second resistor.

2. The communication system according to claim 1,
wherein the first switch connects the first wire to the first potential, which is larger than the common potential, and connects the second wire to the second potential, which is smaller than the common potential, if a value of the binary information that is output by the communication processing unit is a first value, and
the first switch disconnects the first wire from the first potential and disconnects the second wire from the second potential, if the value of the binary information that is output by the communication processing unit is a second value, and
the second switch disconnects the first wire and the second wire from each other, if the abnormality detection unit has not detected an abnormality,
the second switch connects the first wire and the second wire via the second resistor, if the abnormality detection unit has detected an abnormality and the value of a message to be transmitted is the first value, and
the second switch disconnects the first wire and the second wire from each other, if the abnormality detection unit has detected an abnormality and the value of the message to be transmitted is the second value.

3. The communication system according to claim 1,
wherein the at least two communication devices include an output destination switching unit configured to switch an output destination of the binary information that is output by the communication processing unit to the first switch if the abnormality detection unit has not detected an abnormality, and to the second switch if the abnormality detection unit has detected an abnormality.

4. The communication system according to claim 1,
wherein each of the communication devices includes a comparator configured to compare the potential of the first wire with the potential of the second wire and output a value that corresponds to the potential difference, the communication device receiving a message by the communication processing unit obtaining the value output from the comparator, and
the at least two communication devices include an inverter configured to invert a logic of the value output from the comparator, and receive a message by the communication processing unit obtaining a value output from the inverter, if the abnormality detection unit has detected an abnormality.

5. The communication system according to claim 1,
wherein the at least one communication device that includes the abnormality detection unit includes an abnormality notification unit configured to notify, if the abnormality detection unit has detected an abnormality, another communication device of the abnormality.

6. The communication system according to claim 1,
wherein the at least two communication devices include a communication integrated circuit (IC) that includes the first switch, the second switch, and the switching control unit.

7. The communication system according to claim 1,
wherein the at least two communication devices include a control IC that includes the communication processing unit, the second switch, and the switching control unit.

8. The communication system according to claim 1,
wherein a plurality of buses are connected to the at least one communication device, and the at least one communication device includes a relay device configured to relay a message between the buses.

9. A communication system in which a plurality of communication devices are connected to each other via a two-wire bus, the plurality of communication devices being configured to transmit and receive a message using a differential communication scheme by assigning a first state in which a potential difference between a first wire and a second wire of the bus is large and a second state in which the potential difference is small to binary information constituting the message,
wherein the first wire and the second wire are connected to a common potential via respective first resistors,
each of the communication devices includes: a communication processing unit configured to generate a message to be transmitted, and sequentially output binary information constituting the generated message; and a first switch configured to be switched between closed and open states based on the binary information that is output by the communication processing unit, and bring the bus into the first state by connecting the first wire to a first potential, which is larger than the common potential, and connecting the second wire to a second potential, which is smaller than the common potential, at least one communication device includes an abnormality detection unit configured to detect an abnormality in a message transmitted on the bus,
at least two communication devices including the at least one communication device include: a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state by connecting the first wire to the second potential and connecting the second wire to the first potential.

10. The communication system according to claim 9,
wherein the at least two communication devices include a first communication IC that includes the first switch, and a second communication IC that includes the second switch.

11. The communication system according to 10,
wherein each of the communication devices includes at least one comparator configured to compare the potential of the first wire with the potential of the second wire and output a value that corresponds to the potential difference, the communication device receiving a message by the communication processing unit obtaining the value output from the comparator, and
the first communication IC and the second communication IC respectively have the comparators,
the at least two communication devices include an inverter configured to invert a logic of the value output from the comparator of the second communication IC, and the at least two communication devices are configured to:
receive a message by the communication processing unit obtaining a value output from the comparator of the first communication IC, if the abnormality detection unit has not detected an abnormality, and
receive a message by the communication processing unit obtaining a value output from the inverter, if the abnormality detection unit has an abnormality.

12. A communication system in which a plurality of communication devices are connected to each other via a two-wire bus, the plurality of communication devices being configured to transmit and receive a message using a differential communication scheme by assigning a first state in which a potential difference between a first wire and a second wire of the bus is large and a second state in which the potential difference is small to binary information constituting the message,
wherein the first wire and the second wire are connected to a common potential via respective first resistors,
each of the communication devices includes: a communication processing unit configured to generate a message to be transmitted, and sequentially output binary information constituting the generated message; and a first switch configured to be switched between closed and open states based on the binary information that is output by the communication processing unit, and bring the bus into the first state by connecting the first wire to a first potential, which is larger than the common potential, and connecting the second wire to a second potential, which is smaller than the common potential, at least one communication device includes an abnormality detection unit configured to detect an abnormality in a message transmitted on the bus, at least two communication devices including the at least one communication device include: a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state.

13. A communication device to which a two-wire bus is connected, and that is configured to transmit and receive a message using a differential communication scheme by assigning a first state in which a potential difference between a first wire and a second wire of the bus is large, and a second state in which the potential difference is small to binary information constituting the message, wherein the first wire and the second wire are connected to a common potential via respective first resistors, and the communication device comprises:

a communication processing unit configured to generate a message to be transmitted, and sequentially output binary information constituting the generated message;

a first switch configured to be switched between closed and open states based on the binary information that is output by the communication processing unit, and bring the bus into the first state by connecting the first wire to a first potential, which is larger than the common potential, and connecting the second wire to a second potential, which is smaller than the common potential;

an abnormality detection unit configured to detect an abnormality in a message transmitted on the bus;

a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state by connecting the first wire and the second wire via a second resistor.

14. A communication device to which a two-wire bus is connected, and that is configured to transmit and receive a message using a differential communication scheme by assigning a first state in which a potential difference between a first wire and a second wire of the bus is large, and a second state in which the potential difference is small to binary information constituting the message, wherein the first wire and the second wire are connected to a common potential via respective first resistors, and the communication device comprises:

a communication processing unit configured to generate a message to be transmitted, and sequentially output binary information constituting the generated message;

a first switch configured to be switched between closed and open states based on the binary information that is output by the communication processing unit, and bring the bus into the first state by connecting the first wire to a first potential, which is larger than the common potential, and connecting the second wire to a second potential, which is smaller than the common potential;

an abnormality detection unit configured to detect an abnormality in a message transmitted on the bus;

a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state by connecting the first wire to the second potential and connecting the second wire to the first potential.

15. A communication device to which a two-wire bus is connected, and that is configured to transmit and receive a message using a differential communication scheme by assigning a first state in which a potential difference between a first wire and a second wire of the bus is large, and a second state in which the potential difference is small to binary information constituting the message, wherein the first wire and the second wire are connected to a common potential via respective first resistors, and the communication device comprises:

a communication processing unit configured to generate a message to be transmitted, and sequentially output binary information constituting the generated message;

a first switch configured to be switched between closed and open states based on the binary information that is output by the communication processing unit, and bring the bus into the first state by connecting the first wire to a first potential, which is larger than the common potential, and connecting the second wire to a second potential, which is smaller than the common potential;

an abnormality detection unit configured to detect an abnormality in a message transmitted on the bus;

a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state.

16. A relay device to which a plurality of two-wire buses are connected, and that is configured to transmit and receive a message using a differential communication scheme by assigning a first state in which a potential difference between a first wire and a second wire of the bus is large and a second state in which the potential difference is small to binary information constituting the message, and relay the message between the buses, wherein the first wire and the second wire are connected to a common potential via respective first resistors, and the relay device comprises:

a communication processing unit configured to generate a message to be transmitted, and sequentially output binary information constituting the generated message;

a first switch configured to be switched between closed and open states based on the binary information that is output by the communication processing unit, and bring the corresponding bus into the first state by connecting the first wire to a first potential, which is larger than the common potential, and connecting the second wire to a second potential, which is smaller than the common potential;

an abnormality detection unit configured to detect an abnormality in a message transmitted on the bus;

a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state by connecting the first wire and the second wire via a second resistor.

17. A relay device to which a plurality of two-wire buses are connected, and that is configured to transmit and receive a message using a differential communication scheme by assigning a first state in which a potential difference between a first wire and a second wire of the bus is large and a second state in which the potential difference is small to binary information constituting the message, and relay the message between the buses, wherein the first wire and the second wire are connected to a common potential via respective first resistors, and the relay device comprises:

a communication processing unit configured to generate a message to be transmitted, and sequentially output binary information constituting the generated message;

a first switch configured to be switched between closed and open states based on the binary information that is output by the communication processing unit, and bring the corresponding bus into the first state by connecting the first wire to a first potential, which is larger than the common potential, and connecting the second wire to a second potential, which is smaller than the common potential;

an abnormality detection unit configured to detect an abnormality in a message transmitted on the bus;

a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state by connecting the first wire to the second potential and connecting the second wire to the first potential.

18. A relay device to which a plurality of two-wire buses are connected, and that is configured to transmit and receive a message using a differential communication scheme by assigning a first state in which a potential difference between a first wire and a second wire of the bus is large and a second state in which the potential difference is small to binary information constituting the message, and relay the message between the buses, wherein the first wire and the second wire are connected to a common potential via respective first resistors, and the relay device comprises:

a communication processing unit configured to generate a message to be transmitted, and sequentially output binary information constituting the generated message;

a first switch configured to be switched between closed and open states based on the binary information that is output by the communication processing unit, and bring the corresponding bus into the first state by connecting the first wire to a first potential, which is larger than the common potential, and connecting the second wire to a second potential, which is smaller than the common potential;

an abnormality detection unit configured to detect an abnormality in a message transmitted on the bus;

a switching control unit configured to switch, if the abnormality detection unit has detected an abnormality, the first switch so that the first wire is connected to the first potential and the second wire is connected to the second potential, bringing the bus into the first state; and a second switch configured to be switched between closed and open states based on the binary information that is output by the communication processing unit if the abnormality detection unit has detected an abnormality, and bring the bus into the second state.

19. A communication IC to which a two-wire bus is connected, and that is configured to transmit and receive a message using a differential communication scheme by assigning a first state in which a potential difference between a first wire and a second wire of the bus is large and a second state in which the potential difference is small to binary information constituting the message, wherein the first wire and the second wire are connected to a common potential via respective first resistors, the communication IC comprises:

a first switch configured to bring the bus into the first state by connecting the first wire to a first potential, which is larger than the common potential, and connecting the second wire to a second potential, which is smaller than the common potential;

a second switch configured to bring the bus into the second state by connecting the first wire and the second wire via a second resistor;

a switching control unit configured to switch, if an abnormality in a message transmitted on the bus has been detected, the first switch so that the first wire is connected to the first potential and the second wire is connected to the second potential, bringing the bus into the first state; and an output destination switching unit to which binary information constituting a transmission message is sequentially input, and that is configured to switch an output destination of the input binary information to the first switch if no abnormality has been detected, and to the second switch if such an abnormality has been detected.

20. A control IC that transmits a message to a communication IC that includes a first switch, by outputting a signal for controlling the first switch to be in a closed state or an open state, the first switch being configured to connect a first wire of a two-wire bus to a first potential, which is larger than the common potential, and connect a second wire of the two-wire bus to a second potential, which is smaller than the common potential, the first wire and the second wire of the two-wire bus being connected to a common potential via respective first resistors, the control IC comprising:
- a communication processing unit configured to generate a message to be transmitted, and sequentially output binary information constituting the generated message;
- a second switch configured to connect the first wire and the second wire via a second resistor;
- a switching control unit configured to switch, if an abnormality in a message transmitted on the bus has been detected, the first switch so that the first wire is connected to the first potential and the second wire is connected to the second potential; and
- an output destination switching unit configured to switch an output destination of the binary information from the communication processing unit to the first switch if an abnormality has not been detected, and to the second switch if such an abnormality has been detected.

21. A communication method for a plurality of communication devices transmitting and receiving a message using a differential communication scheme by assigning a first state in which a potential difference between a first wire and a second wire of a bus is large and a second state in which the potential difference is small to binary information constituting the message,
- wherein the first wire and the second wire are connected to a common potential via respective first resistors,
- each communication device switches a first switch between closed and open states based on binary information constituting a message to be transmitted, and transmits the message, the first switch being configured to bring the bus into the first state by connecting the first wire to a first potential, which is larger than the common potential, and connecting the second wire to a second potential, which is smaller than the common potential,
- at least one communication device detects an abnormality in a message transmitted on the bus, and
- if the abnormality has been detected, at least two communication devices that include the at least one communication device switches the first switch so that the first wire is connected to the first potential and the second wire is connected to the second potential, and switches a second switch between closed and open states based on binary information constituting the message to be transmitted, and transmits the message, the second switch being configured to bring the bus into the second state by connecting the first wire and the second wire via a second resistor.

22. A communication method for a plurality of communication devices transmitting and receiving a message using a differential communication scheme by assigning a first state in which a potential difference between a first wire and a second wire of a bus is large and a second state in which the potential difference is small to binary information constituting the message,
- wherein the first wire and the second wire are connected to a common potential via respective first resistors,
- each communication device switches a first switch between closed and open states based on binary information constituting a message to be transmitted, and transmits the message, the first switch being configured to bring the bus into the first state by connecting the first wire to a first potential, which is larger than the common potential, and connecting the second wire to a second potential, which is smaller than the common potential,
- at least one communication device detects an abnormality in a message transmitted on the bus, and
- if the abnormality has been detected, at least two communication devices that include the at least one communication device switches the first switch so that the first wire is connected to the first potential and the second wire is connected to the second potential, and switches a second switch between closed and open states based on binary information constituting the message to be transmitted, and transmits the message, the second switch being configured to bring the bus into the second state by connecting the first wire to the second potential and connecting the second wire to the first potential.

23. A communication method for a plurality of communication devices transmitting and receiving a message using a differential communication scheme by assigning a first state in which a potential difference between a first wire and a second wire of a bus is large and a second state in which the potential difference is small to binary information constituting the message,
- wherein the first wire and the second wire are connected to a common potential via respective first resistors,
- each communication device switches a first switch between closed and open states based on binary information constituting a message to be transmitted, and transmits the message, the first switch being configured to bring the bus into the first state by connecting the first wire to a first potential, which is larger than the common potential, and connecting the second wire to a second potential, which is smaller than the common potential,
- at least one communication device detects an abnormality in a message transmitted on the bus, and
- if the abnormality has been detected, at least two communication devices that include the at least one communication device switches the first switch so that the first wire is connected to the first potential and the second wire is connected to the second potential, and switches a second switch between closed and open states based on binary information constituting the message to be transmitted, and transmits the message, the second switch being configured to bring the bus into the second state.

* * * * *